(12) United States Patent
Gutman et al.

(10) Patent No.: US 11,856,528 B2
(45) Date of Patent: Dec. 26, 2023

(54) TECHNIQUES FOR TEMPERATURE ADAPTATION FOR DIGITAL PRE-DISTORTION FACTORY TRAINING

(71) Applicant: QUALCOMM Incorporated, San Diego, CA (US)

(72) Inventors: Igor Gutman, Hod HaSharon (IL); Robert Zokaim, Kfar Saba (IL); Oren Matsrafi, Karkur (IL); Yehezkel Hadid, Kfar Saba (IL); Ghaith Shabsigh, San Diego, CA (US); Rahul Malik, San Diego, CA (US); Carl Hardin, Encinitas, CA (US); Damin Cao, San Diego, CA (US); Michael Lee McCloud, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 167 days.

(21) Appl. No.: 17/572,102

(22) Filed: Jan. 10, 2022

(65) Prior Publication Data
US 2023/0224825 A1  Jul. 13, 2023

(51) Int. Cl.
*H04W 52/36* (2009.01)
*H04B 1/04* (2006.01)
(Continued)

(52) U.S. Cl.
CPC .......... *H04W 52/36* (2013.01); *H04B 1/0475* (2013.01); *H04B 1/62* (2013.01); *H04W 72/0473* (2013.01); *H04B 2001/0425* (2013.01)

(58) Field of Classification Search
CPC ............. H04W 52/36; H04W 72/0473; H04W 52/146; H04W 52/246; H04W 52/362;
(Continued)

(56) References Cited

U.S. PATENT DOCUMENTS

| 6,282,247 B1 * | 8/2001 | Shen | H04B 1/0475 |
| | | | 455/126 |
| 7,099,399 B2 * | 8/2006 | McCallister | H03F 1/3241 |
| | | | 375/296 |

(Continued)

FOREIGN PATENT DOCUMENTS

| EP | 1983659 B1 | 1/2016 |
| EP | 3166223 B1 | 9/2020 |
| WO | WO-2019227020 A1 | 11/2019 |

OTHER PUBLICATIONS

International Search Report and Written Opinion—PCT/US2022/081664—ISA/EPO—dated May 12, 2023.

*Primary Examiner* — Lana N Le
(74) *Attorney, Agent, or Firm* — Dalei Dong; Holland & Hart LLP

(57) ABSTRACT

Methods, systems, and devices for wireless communications are described. Some wireless communications systems may support adaptation of digital pre-distortion (DPD) coefficients based on a temperature of a user equipment (UE). The UE may determine a power offset value based on a first temperature value associated with a training procedure for the UE, a second temperature value associated with the UE, and a constant value. The training procedure may be associated with multiple sets of coefficients for the UE. The UE may apply the power offset value to a transmission power level for transmission of a message. The UE may determine a set of coefficients of the multiple sets of coefficients based on the training procedure and the power offset value applied to the transmission power level. The UE may apply the coefficients to a DPD engine of the UE to generate the message for transmission at the transmission power level.

30 Claims, 12 Drawing Sheets

(51) Int. Cl.
*H04B 1/62* (2006.01)
*H04W 72/044* (2023.01)

(58) Field of Classification Search
CPC .. H04W 52/52; H04W 52/226; H04B 1/0475; H04B 1/62; H04B 2001/0425; H04B 2001/0408; H04B 17/13; H04B 1/04; H04L 27/368; H04L 27/367; H04L 2027/0018; H04L 27/2626; H03G 3/3042; H03F 1/3247; H03F 2201/3233; H03F 2201/3227; H03F 2200/447; H03F 1/3241; H03F 2200/207; H03F 2200/105; H03F 1/32; H03F 1/30; H03F 2200/468; H03F 2200/411; H03F 2200/451; H03F 3/189; H03F 2201/3215; H03F 2200/435

See application file for complete search history.

(56) References Cited

U.S. PATENT DOCUMENTS

| | | | |
|---|---|---|---|
| 7,109,792 B2 | 9/2006 | Leffel | |
| 7,596,081 B2* | 9/2009 | Geile | H04L 27/367 375/296 |
| 8,340,603 B2* | 12/2012 | Brown | H03F 1/32 455/114.3 |
| 8,588,332 B2* | 11/2013 | Cai | H04W 52/52 455/522 |
| 11,296,735 B1* | 4/2022 | Kutz | H04B 1/0475 |
| 11,658,692 B2* | 5/2023 | Gutman | H04B 1/0475 455/114.3 |
| 2004/0164798 A1 | 8/2004 | Adachi et al. | |
| 2005/0163249 A1 | 7/2005 | McCallister | |
| 2014/0292403 A1 | 10/2014 | Liu et al. | |
| 2020/0067543 A1* | 2/2020 | Kim | H03F 1/3241 |

* cited by examiner

TECHNIQUES FOR TEMPERATURE ADAPTATION FOR DIGITAL PRE-DISTORTION FACTORY TRAINING

FIELD OF DISCLOSURE

The present disclosure, for example, relates to wireless communication systems, more particularly to techniques for temperature adaptation for digital pre-distortion (DPD) factory training.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a transmitting device, such as a base station or a UE, may be equipped with multiple antenna elements each with an associated power amplifier (PA) for transmitting beamformed communications. The transmitting device may experience non-linearities and other distortions associated with operations of the PAs. The transmitting device may apply a digital pre-distortion (DPD) to the signals to mitigate a degree of the distortion.

SUMMARY

The present disclosure relates to improved methods, systems, devices, and apparatuses that support techniques for temperature adaptation for digital pre-distortion (DPD) factory training. Generally, the techniques described herein provide for adaptation of coefficients based on an operating temperature of a device. In some wireless communications systems, a user equipment (UE) or some other wireless device (e.g., a base station, a network node) may include a set of antenna elements. Each antenna element may be coupled with a corresponding power amplifier (PA) for amplifying signals transmitted by the antenna element. In some examples, the UE may include a DPD engine that may apply coefficients (e.g., DPD coefficients, non-linearity coefficients, or other types of coefficients) to one or more PAs of the UE. The coefficients may be based on a DPD training procedure and may be calibrated to reduce non-linearities associated with the PAs. Some UEs may perform the DPD training in a factory setting at a first temperature, which may be referred to as a factory temperature.

As described herein, a UE may adapt coefficients based on a current operating temperature of the UE. For example, the UE may store multiple sets of coefficients in a measurement database of the UE based on the factory training. Each set of coefficients may be calibrated to reduce non-linearities for a respective transmission power level at the first temperature value. The UE may determine a power offset value based on a constant value and a difference between the first temperature value and a second temperature value that corresponds to an operating temperature of the UE. The UE may apply the power offset value to a transmission power level for transmission of a message (e.g., a target or measured transmission power level) to obtain an adjusted transmission power level that may be based on the operating temperature of the UE. The UE may determine a set of coefficients from the multiple sets of coefficients stored at the UE based on the adjusted transmission power level. The UE may apply the determined set of coefficients to a DPD engine of the UE to generate and transmit the message. The present disclosure may thereby provide for the UE to select accurate and reliable coefficients dynamically based on a current temperature of the UE.

A method for wireless communication at a UE is described. The method may include determining a power offset value based on a first temperature value associated with a training procedure for the UE, a second temperature value associated with the UE, and a constant value, where the training is associated with a set of multiple sets of coefficients for the UE, applying the power offset value to a transmission power level for transmission of a message to obtain a first transmission power level, determining a set of coefficients of the set of multiple sets of coefficients based on the training and the first transmission power level, and applying the set of coefficients to a DPD engine of the UE to generate the message.

An apparatus for wireless communication at a UE is described. The apparatus may include a processor, memory coupled with the processor, and instructions stored in the memory. The instructions may be executable by the processor to cause the apparatus to determine a power offset value based on a first temperature value associated with a training procedure for the UE, a second temperature value associated with the UE, and a constant value, where the training procedure is associated with a set of multiple sets of coefficients for the UE, apply the power offset value to a transmission power level for transmission of a message to obtain a first transmission power level, determine a set of coefficients of the set of multiple sets of coefficients based on the training procedure and the first transmission power level, and apply the set of coefficients to a DPD engine of the UE to generate the message.

Another apparatus for wireless communication at a UE is described. The apparatus may include means for determining a power offset value based on a first temperature value associated with a training procedure for the UE, a second temperature value associated with the UE, and a constant value, where the training procedure is associated with a set of multiple sets of coefficients for the UE, means for applying the power offset value to a transmission power level for transmission of a message to obtain a first transmission power level, means for determining a set of coefficients of the set of multiple sets of coefficients based on the training procedure and the first transmission power level, and means for applying the set of coefficients to a DPD engine of the UE to generate the message.

A non-transitory computer-readable medium storing code for wireless communication at a UE is described. The code may include instructions executable by a processor to determine a power offset value based on a first temperature value associated with a training procedure for the UE, a second temperature value associated with the UE, and a constant value, where the training procedure is associated with a set of multiple sets of coefficients for the UE, apply the power offset value to a transmission power level for transmission of a message to obtain a first transmission power level, determine a set of coefficients of the set of multiple sets of coefficients based on the training procedure and the first transmission power level, and apply the set of coefficients to a DPD engine of the UE to generate the message.

In some examples of the method, apparatuses, and non-transitory computer-readable medium described herein, applying the set of coefficients to the DPD engine may include operations, features, means, or instructions for distorting a signal based on applying the set of coefficients to the DPD engine, amplifying the signal using a PA of the UE that may be coupled with at least one antenna element of a set of multiple antenna elements of the UE, and transmitting the message in accordance with the transmission power level and based on amplifying the signal.

In some examples of the method, apparatuses, and non-transitory computer-readable medium described herein, transmitting the message may include operations, features, means, or instructions for transmitting the message from the at least one antenna element of the UE that may be coupled with the PA.

Some examples of the method, apparatuses, and non-transitory computer-readable medium described herein may further include operations, features, means, or instructions for storing, based on the training procedure, the set of multiple sets of coefficients including at least the set of coefficients in a database of the UE, each set of coefficients associated with a respective transmission power level of a set of multiple transmission power levels including at least the first transmission power level, where determining the set of coefficients may be based on the first transmission power level of the set of multiple transmission power levels and the database.

In some examples of the method, apparatuses, and non-transitory computer-readable medium described herein, applying the power offset value to the transmission power level may include operations, features, means, or instructions for determining the first transmission power level based on a sum of the power offset value and the transmission power level, where the power offset value may be based on a difference between the first temperature value and the second temperature value.

In some examples of the method, apparatuses, and non-transitory computer-readable medium described herein, the database of the UE includes non-volatile memory.

Some examples of the method, apparatuses, and non-transitory computer-readable medium described herein may further include operations, features, means, or instructions for performing the training procedure, where performing the training procedure may include operations, features, means, or instructions for determining a respective set of coefficients for each transmission power level of the set of multiple transmission power levels, where the respective set of coefficients reduces non-linearities associated with transmissions by the UE at the respective transmission power level, and where a temperature of the UE during the training corresponds to the first temperature value.

In some examples of the method, apparatuses, and non-transitory computer-readable medium described herein, the constant value may be based on one or more parameters associated with a PA at the UE, the one or more parameters including one or more values indicative of a type of the PA, a physics of the PA, one or more materials within the PA, or any combination thereof.

Some examples of the method, apparatuses, and non-transitory computer-readable medium described herein may further include operations, features, means, or instructions for determining a difference between the first temperature value and the second temperature value of the UE, where determining the power offset value may be based on the difference.

Some examples of the method, apparatuses, and non-transitory computer-readable medium described herein may further include operations, features, means, or instructions for measuring the second temperature value of the UE, where the second temperature value corresponds to an operating temperature of the UE.

In some examples of the method, apparatuses, and non-transitory computer-readable medium described herein, transmitting the message may include operations, features, means, or instructions for transmitting the message in a frequency range 2 (FR2) or a frequency range including frequencies that may be greater than the FR2.

DETAILED DESCRIPTION

Figure 1:
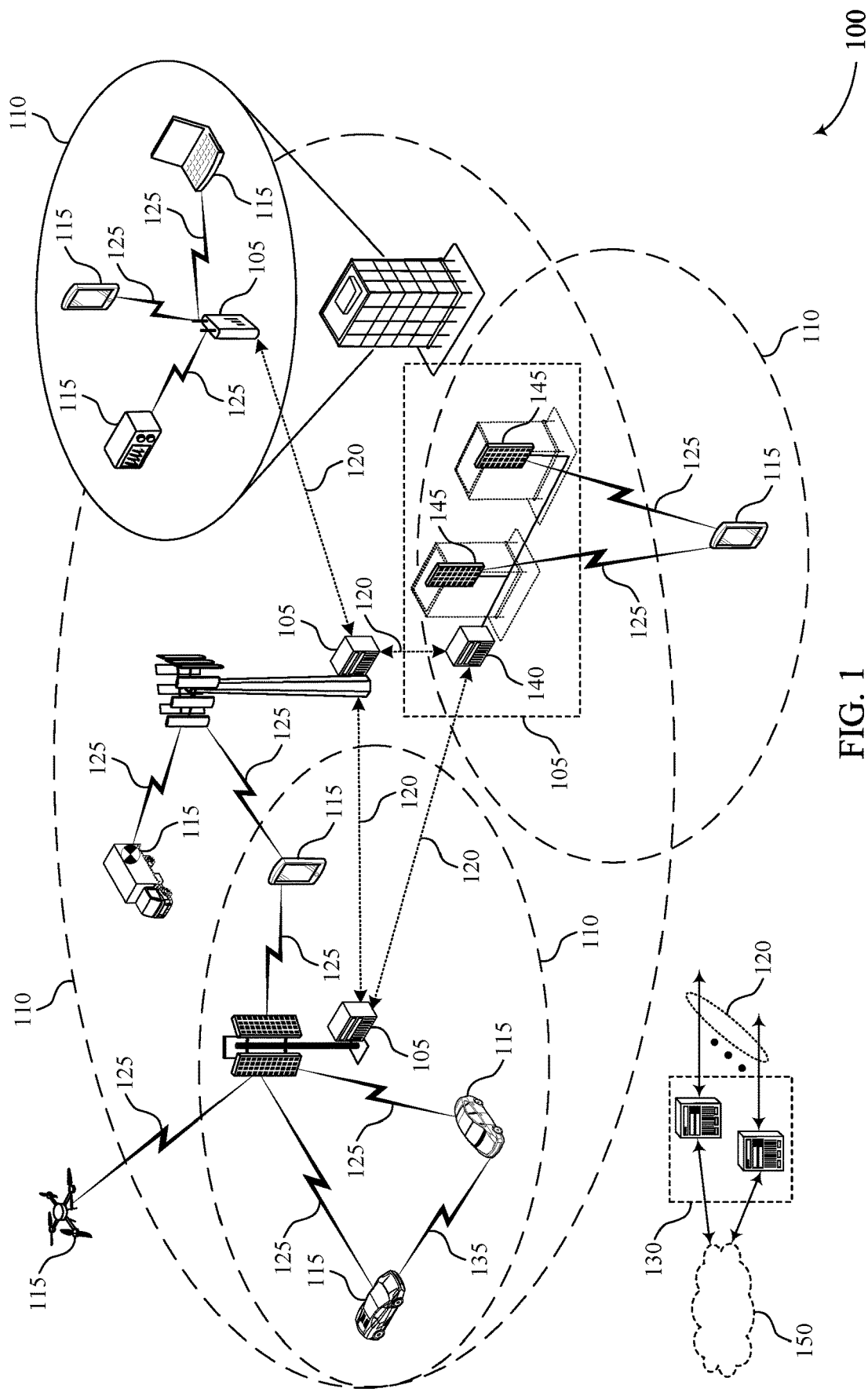
FIG. 1 illustrates an example of a wireless communications system that supports techniques for temperature adaptation for digital pre-distortion (DPD) factory training in accordance with aspects of the present disclosure.

In some wireless communications systems, a user equipment (UE), or some other wireless device, may be equipped with non-linear transmission circuitry, such as one or more non-linear power amplifiers (PAs), or other components that may be non-linear. The non-linearities of the transmission circuitry may cause distortion in signals transmitted by the UE. To reduce distortion, in some cases, a power back-off (BO) may be applied. However, the power BO may be associated with less power efficiency, resulting in less power being transmitted to a receiving device. Additionally or alternatively, a digital pre-distortion (DPD) may be implemented. DPD may increase linearity or compensate for non-linearity in PAs or other transmission circuitry. A DPD training procedure may be performed to determine one or more DPD coefficients (e.g., non-linearity coefficients) that may be applied to a DPD engine of the UE to offset or otherwise mitigate the impact of non-linearities associated with the transmission circuitry.

A UE may, in some cases, perform the DPD training over-the-air (OTA) to dynamically determine the non-linearity coefficients based on current communication parameters. For example, an antenna element of the UE may feedback information to a DPD engine of the UE, and the DPD engine may dynamically adjust which DPD coefficients are applied based on the feedback information. In some cases, however, a UE may be equipped with a relatively large quantity of antenna elements (e.g., during communications in relatively high frequency ranges). In such cases, circuitry to support OTA training may be associated with relatively high cost and complexity, and the UE may not support OTA DPD training. Instead, the DPD coefficients for different target transmit powers may be determined based on DPD training performed in a factory setting upon initialization of the UE or during a manufacturing stage of the UE. In this case, the DPD coefficients may be calibrated for multiple transmission power levels of the UE at a single factory temperature. The DPD coefficients may not reliably mitigate non-linearities for transmissions by the UE at other operating temperatures, which may reduce communication reliability and throughput.

Techniques described herein provide for a UE to adapt DPD coefficients based on a current operating temperature of the UE, which may improve accuracy and reliability of transmissions by the UE at a range of operating temperatures when factory DPD training is performed. The UE may perform the factory DPD training and store a respective set of DPD coefficients for each transmit power of a set of potential transmit powers of the UE in a memory of the UE. The DPD coefficients for each transmit power may be calibrated and trained at a single temperature (e.g., a factory temperature). The UE may identify a target transmit power level for transmission of a message, and the UE may adjust the target transmit power based on the operating temperature of the UE, the factory temperature, and a constant value. The constant value may be based on a design or technology of a PA at the UE (e.g., based on physics associated with the PA). The adjusted transmit power may provide a pointer to a respective set of DPD coefficients stored in the database that may effectively reduce distortions at the target transmit power level and the current operating temperature of the UE.

To adjust the transmit power, the UE may determine a difference between the factory temperature and the operating temperature of the UE. The UE may divide the difference by the constant value to obtain a power offset value. The UE may determine a second difference between the power offset value and the initial target transmission power level for transmission of the message. The second difference may correspond to the adjusted transmit power and may point to an entry in the database stored at the UE. The entry may include the respective set of DPD coefficients to be applied for a transmission at the target power and the operating temperature. The UE may apply the set of DPD coefficients to a DPD engine of the UE. The DPD engine may distort a signal based on the set of DPD coefficients. The distorted signal may be amplified by a PA and transmitted via a corresponding antenna element of the UE. The UE may thereby support efficient and reliable DPD training and adaptation procedures.

The techniques described herein may be employed by a wireless device, such as a UE, to improve DPD training procedures, which may improve communication reliability, reduce latency, and reduce power consumption. For example, a UE may perform a DPD training procedure in a factory setting upon initialization of the UE, which may be associated with reduced complexity and power consumption as compared with other types of DPD training procedures, such as OTA DPD training. As described herein, the UE may account for a current operating temperature of the UE when selecting DPD coefficients to apply. The DPD coefficients may thereby be more reliable and provide for improved coordination between devices as compared with other techniques for DPD coefficient calibration and selection that do not account for an operating temperature.

Aspects of the disclosure are initially described in the context of wireless communications systems. Additional aspects of the disclosure are described with reference to power output models, flow diagrams, and process flows. Aspects of the disclosure are further illustrated by and described with reference to apparatus diagrams, system diagrams, and flowcharts that relate to techniques for temperature adaptation for DPD factory training.

FIG. 1 illustrates an example of a wireless communications system 100 that supports techniques for temperature adaptation for DPD factory training in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a respective radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The present disclosure may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna elements that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at one or more orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a respective orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may support dynamic adaptation of coefficients based on an operating temperature of the UE 115. For example, in the wireless communications system 100, a UE 115 or some other wireless device (e.g., a base station 105, a network node) may include a set of antenna elements. Each antenna element may be coupled with a corresponding PA of the UE 115 for amplifying signals transmitted by the antenna element. In some examples, the UE 115 may include a DPD engine that may apply coefficients to the PAs. The coefficients may be based on a DPD training procedure and may be calibrated to reduce non-linearities associated with the PAs. Some UEs 115 may perform the DPD training in a factory setting at a first temperature, which may be referred to as a factory temperature.

As described herein, a UE 115 may adapt coefficients based on a current operating temperature of the UE 115. For example, the UE 115 may store multiple sets of coefficients in a measurement database of the UE 115 based on the factory training. Each set of coefficients may be calibrated to reduce non-linearities for a respective transmission power level at the first temperature value. The UE 115 may determine a power offset value based on a constant value and a difference between the first temperature value and a second temperature value that corresponds to an operating temperature of the UE 115. The UE 115 may apply the power offset value to a transmission power level for transmission of a message (e.g., a target or measured transmission power level) to obtain an adjusted transmission power level that may be based on the operating temperature of the UE 115. The UE 115 may determine a set of coefficients from the multiple sets of coefficients stored at the UE 115 based on the adjusted transmission power level. The UE 115 may apply the determined set of coefficients to a DPD engine of the UE 115 to generate and transmit the message. The present disclosure may thereby provide for the UE 115 to select accurate and reliable coefficients dynamically based on a current temperature of the UE 115

Figure 2:
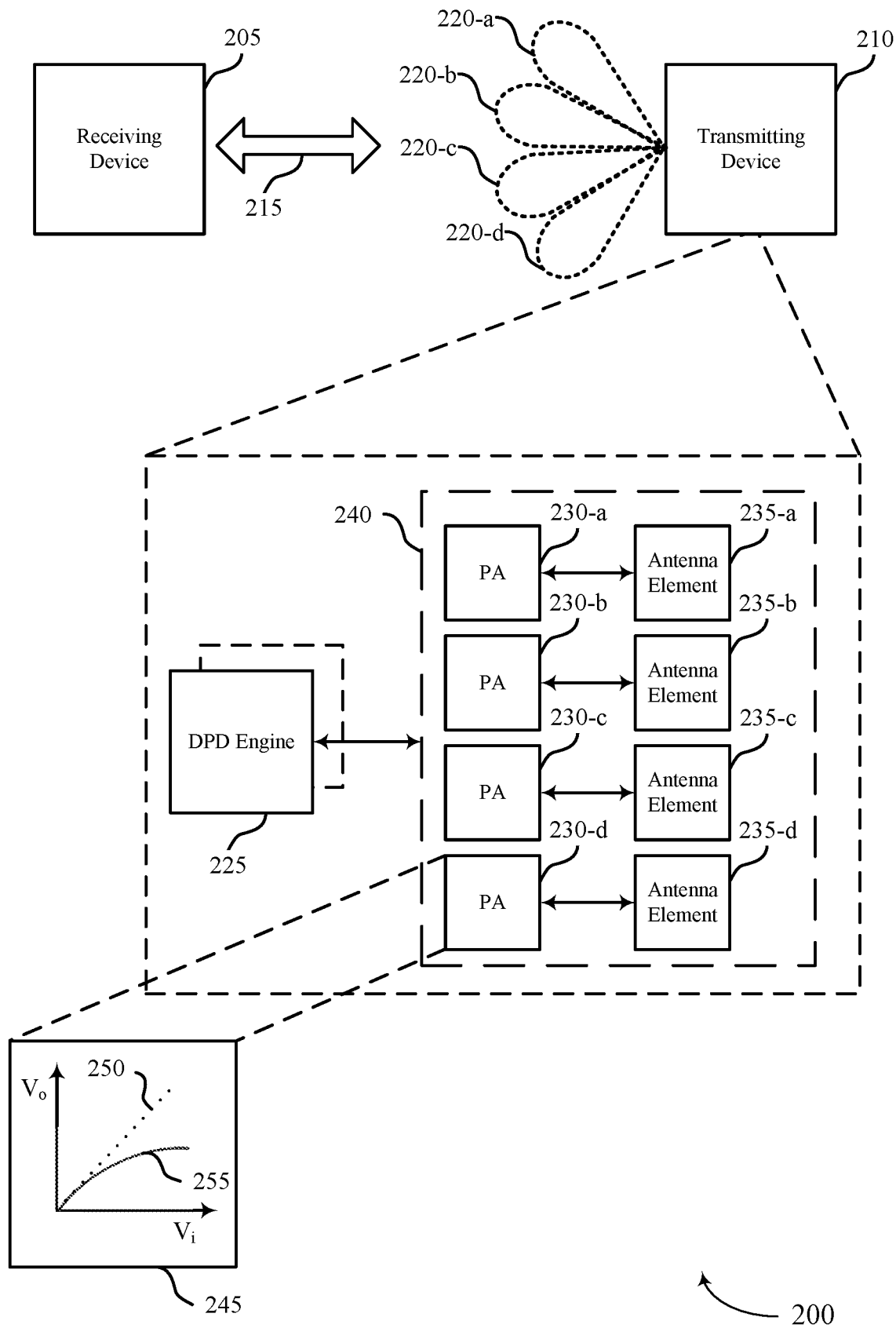
FIG. 2 illustrates an example of a wireless communications system that supports techniques for temperature adaptation for DPD factory training in accordance with aspects of the present disclosure.

FIG. 2 illustrates an example of a wireless communications system 200 that supports techniques for temperature adaptation for DPD factory training in accordance with aspects of the present disclosure. The wireless communications system 200 may implement or be implemented by aspects of the wireless communications system 100 as described with reference to FIG. 1. For example, the wireless communications system 200 includes a receiving device 205 which may be an example of a UE 115 or base station 105 as described with reference to FIG. 1. In some examples, the receiving device 205 may be an example of a relay device, IAB nodes, or other network equipment. The wireless communications system 200 also includes a transmitting device 210 which may be an example of a base station 105 or a UE 115, among other examples. In some examples, the transmitting device 210 may be an example of a relay device, IAB nodes, or other network equipment. The receiving device 205 and the transmitting device 210 may communicate via a communication link 215.

The transmitting device 210 may transmit using a number of beamformed transmit beams 220, such as transmit beams 220-a, 220-b, 220-c, and 220-d. The transmitting device 210 may, in some examples, include an antenna component 240. In some examples, while not shown, the transmitting device 210 may include more than one antenna component 240. For example, the transmitting device 210 may include eight antenna components in some implementations. The antenna component 240 may include a number of PAs 230 and antenna elements 235. While FIG. 2 depicts an antenna component 240 having four PAs 230 and four antenna elements 235, it is to be understood that the example is for illustrative purpose and is not limiting. A transmitting device 210 may have any number of PAs 230 and antenna elements 235, as may an individual antenna component 240.

Each PA 230 may amplify signals to be transmitted by the transmitting device 210. For example, the PA 230-a may amplify, or increase, a power of a signal before the signal is transmitted from the antenna element 235-a. Each of the PAs 230-a, 230-b, 230-c, and 230-d may be associated with a corresponding antenna element 235-a, 235-b, 235-c, and 235-d, respectively. Increasing power of transmitted signals may provide for improved communication reliability. As such, a large portion of system design of a transmitting device 210 may be based on improving an output power (e.g., utilization efficiency of a resource, such as radiated power). However, as an amount of power that is amplified by a transmitting device 210 increases, non-linearities, or distortions, in the signal may occur due to one or more non-linear components of the transmitting device 210. For example, the transmitting device 210 may include non-linear PAs 230 (e.g., high-power PAs 230 with relatively limited dynamic range). Such non-linear components may distort a transmitted signal due to, for example, high peak-to-average-power ratio (PAPR).

Each PA 230 may be associated with a non-linearity at one or more radiated power levels. Graph 245 shows an example non-linearity caused by a PA 230-d, for example. The graph 245 shows a signal in the context of an input signal $V_i$ and an output signal, $V_o$. That is, the signal may be received at the PA 230-d at a voltage, $V_i$ and may be transmitted by the PA 230-d at a voltage, $V_o$. If the PA 230-d were an ideal PA, $V_i$ would be linearly related to $V_o$. For example, curve 250 may be an example of a linear relationship between $V_i$ and $V_o$. However, in many cases, PAs 230 may cause non-linear effects. For example, the PA 230-d may cause a non-linear relationship 255 between $V_i$ and $V_o$, which may be referred to as distortion. Likewise, other PAs 230, such as the PAs 230-a, 230-b, and 230-c, may cause non-linear effects. In some examples, such effects may be different from the non-linear effects caused by PA 230-d, for example, when considering beamforming configurations. For example, each PA 230 may experience different non-linearity characteristics due to different physical layouts and beamforming configurations, which generates different loading configurations per antenna element 235 and PA 230 pair.

There may be a number of types of distortion including in-band distortion and out-band distortion. For example, in-band distortion may be caused by an uncorrelated component of the non-linear output. That is, the signaling waveform transmitted by the transmitting device 210 may be distorted as it is transmitted—however—the distortions may remain within a frequency band in which the transmitting device 210 is configured to transmit. In-band distortion may affect link performance and may affect mutual information or/and error vector magnitude.

Out-band distortion may also be caused by an uncorrelated component of the non-linear output. That is, the signaling waveform transmitted by the transmitting device 210 may be distorted as it is transmitted, however, out-band distortions may interfere with frequency bands adjacent to the frequency band in which the transmitting device 210 is configured to transmit. This may also be referred to as out of band (OOB) adjacent channel interference (ACI). The ACI may indicate how much an adjacent channel is polluted (e.g., interfered) by the transmitted signaling.

To avoid distortion, in some cases, power BO may be introduced. However, as power BO increases, power efficiency may decrease, resulting in less power being transmitted to the transmitting device 210. Additionally or alternatively, DPD may be implemented in the transmitter's digital front end. Using the DPD, the degree of distortion may be mitigated and may be limited to a target distortion level, while the power BO may be minimized. This may improve efficiency of the PAs 230.

The transmitting device 210 may include one or more DPD engines 225 to support implementation of DPD. DPD may increase linearity or compensate for non-linearity in PAs 230. For example, a DPD engine 225 of the transmitting device 210 may calculate and apply a set of DPD coefficients to an antenna array of the transmitting device 210 (e.g., the antenna elements 235-a, 235-b, 235-c, and 235-d), which may mitigate distortion caused by the corresponding PAs 230-a, 230-b, 230-c, and 230-d.

In some wireless communications systems (e.g., relatively low frequency systems, such as communications via a frequency range 1 (FR1)), each DPD engine 225 may support a single PA 230, or a relatively small quantity of PAs 230 located on a single radio frequency (RF) or antenna component 240. In this example, the non-linearity coefficients of the PA(s) 230 may be similar. In some examples (e.g., FR1), DPD training between a DPD engine 225 and one or more antenna elements 235 may be performed over-the-air (OTA). For example, a transmitting element and a receiving element may be selected, and OTA feedback receivers (FBRX) may be used to close the loop between the elements and the DPD engine 225 for DPD training. The antenna elements 235 may dynamically feedback information related to transmitted and received signals to the respective DPD engine 225. In this example, the DPD engine 225 may utilize the feedback information to dynamically calibrate and adjust DPD coefficients for the corresponding PA 230. The DPD engine 225 may thereby reduce non-linearities by the PA 230, even as one or more operating parameters of the PA 230 change over time, such as a temperature of the PA 230. That is, DPD coefficients may be trained in real-time (e.g., every 20 ms, or some other duration).

In the wireless communications system 200 (e.g., such a mmW communications systems), DPD may be supported by a single DPD engine which may apply DPD coefficients to an array of PAs 230. That is, each PA 230 may correspond to a respective antenna element 235, and a single port, such as the DPD engine 225, may support all of the PAs 230 and corresponding antenna elements 235. In such examples, supporting feedback between each antenna element 235 and the DPD engine 225 may be relatively complex and expensive. For example, a quantity of PAs 230 and corresponding antenna elements 235 may be relatively high to support beamformed communications and communications via relatively high frequency ranges, such as frequency range 2 (FR2), frequency range 4 (FR4), frequency range 5 (FR5), or above.

As the quantity of antenna elements 235 increases, complexity associated with implementing DPD feedback loops, such as conductive FBRX, between antenna elements 235 and the DPD engine 225 may increase. In such examples, such as for FR2 communications, implementing FBRX may be relatively expensive and complex. Due to an absence of conducted feedback, the transmitting device 210 (e.g., a UE 115) may not be permitted to contaminate the medium which may occur if training is done OTA.

As such, some systems may not support dynamic adjustments of DPD coefficients based on feedback from the antenna elements 235, which may be referred to as online DPD training. In such examples, the transmitting device 210 may perform DPD training (e.g., determination and calibration of DPD coefficients) in a factory setting upon initialization (e.g., during manufacturing of the transmitting device 210 or upon first powering up of the transmitting device 210). Factory DPD training may, in some cases, be performed when online DPD training is not feasible. During the factory DPD training, the transmitting device 210 may determine a set of one or more DPD coefficients for each potential transmit power of the transmitting device 210, which may be referred to as measured or target transmission power levels. For example, the transmitting device 210 may determine a first set of DPD coefficients that reduce non-linearities associated with transmission of a signal at a first transmit power level, a second set of DPD coefficients that reduce non-linearities associated with transmission of a signal at a second transmit power level, and so on.

Each set of DPD coefficients determined during factory DPD training may be stored in a memory of the transmitting device 210 (e.g., a non-volatile memory) and may be indexed according to the corresponding transmit power level. During operation, the transmitting device 210 may determine a target transmission power level for transmitting a signal, identify the DPD coefficients corresponding to the target transmission power level in the memory of the transmitting device 210 (e.g., a table), and apply the DPD coefficients to the DPD engine 225.

Adjusting a temperature of the factory and re-performing the DPD training at each temperature may be relatively time consuming and expensive, such that factory DPD training may be performed at a single factory temperature, similar to other factory training procedures. Factory DPD training may be performed at the same temperature for multiple devices, such as phones, or other mobile or wireless devices. The factory temperature may be a room temperature (e.g., 25 degrees), or some other default arbitrary temperature of the factory. Such factory training may not account for changes in a temperature of the transmitting device 210 during operation (e.g., a regular mission mode). For example, the temperature of the transmitting device 210 may vary during operation (e.g., an operational mode of a UE 115 may vary between −40 degrees and 60 degrees, or within some other range). Such factory training at an arbitrary factory temperature may, in some cases result in performance degradation and reduced reliability due to the DPD coefficients being calibrated and obtained at the factory temperature and applied in scenarios in which the temperature is different (e.g., higher or lower) than the factory temperature. For example, the changes in temperature or other parameters of the PAs 230 during operation may affect an amount or type of non-linear distortions that are produced by the respective PA 230. As such, techniques for dynamically adjusting DPD coefficients based on parameters of a PA 230 when a single DPD engine 225 supports multiple PAs 230 may be desirable.

As described herein, the transmitting device 210 may adapt or dynamically adjust DPD coefficients based on a current temperature of the transmitting device 210, which may improve communication reliability and efficiency. The transmitting device 210 may determine a power offset value based on the current temperature of the transmitting device 210, a factory temperature at which DPD training was performed for the transmitting device 210, and a constant value (C). The transmitting device 210 may bias a target transmission power level for transmission of a signal with the power offset value. For example, the transmitting device 210 may calculate a difference between the target transmission power level and the power offset value. The difference may be referred to as an adjusted transmission power level. The transmitting device 210 may use the DPD coefficients stored in the memory of the transmitting device 210 that are associated with (e.g., indexed by) the adjusted transmission power level. For example, the transmitting device 210 may use the adjusted transmission power level as an index or a pointer to a table of DPD coefficients that is stored in the memory of the transmitting device 210.

Figure 3:
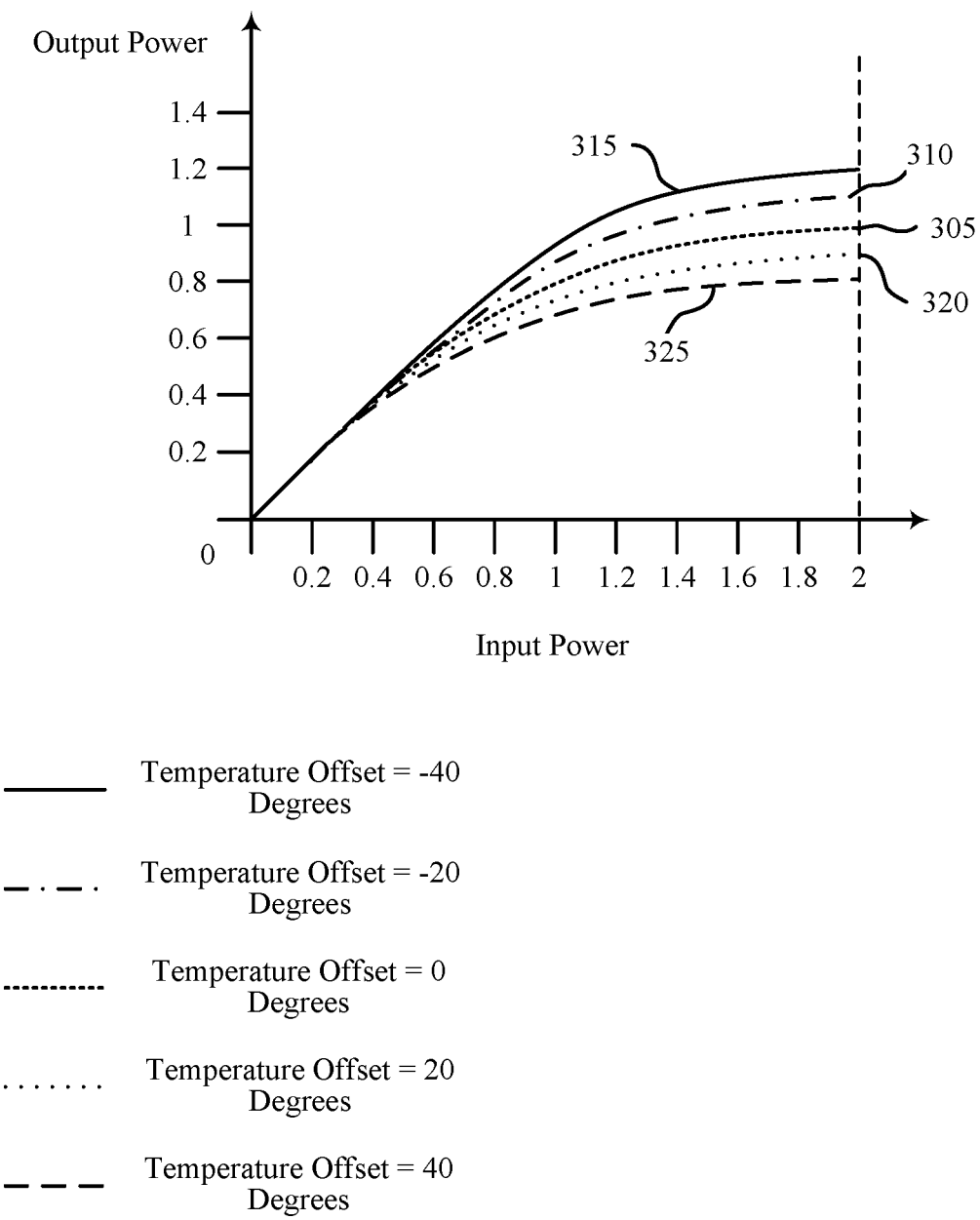
FIG. 3 illustrates an example of a power output model that supports techniques for temperature adaptation for DPD factory training in accordance with aspects of the present disclosure.

By biasing the target transmission power level based on the operating temperature of the transmitting device 210, the factory temperature, and the constant value, the transmitting device 210 may select DPD coefficients that are effective for reducing non-linearities and other distortions in a signal transmitted at the target transmission power level and the current operating temperature of the transmitting device 210. The constant value may be derived based on one or more parameters of a PA 230, a power output model of the PA 230, or both, as illustrated in FIG. 3. The one or more parameters may include a type of the PA 230, a physics of the PA 230, one or more materials within the PA 230, or any combination thereof.

FIG. 3 illustrates an example of a power output model 300 that supports techniques for temperature adaptation for DPD factory training in accordance with aspects of the present disclosure. The power output model 300 may implement or be implemented by aspects of the wireless communications systems 100 and 200 described with reference to FIGS. 1 and 2, respectively. For example, the power output model 300 illustrates example non-linear power output distortions that may be generated by a PA at different PA operating temperatures. The PA may represent an example of one or more of the PAs 230 described with reference to FIG. 2. The PA may be deployed to amplify signals transmitted by a device, which may represent an example of a UE 115, a base station 105, a transmitting device, a receiving device, a network node, or some other device, as described with reference to FIGS. 1 and 2.

The power output model illustrates five example power output curves of a PA, which may illustrate non-linear relationships between an input power at the PA and an output power of the PA before DPD coefficients are applied. Each power output curve may indicate an example relationship between input power at the PA and output power of the PA at a respective temperature. The non-linear model of the PA may change due to changes in temperature, as illustrated by the power output model 300.

During factory DPD training, DPD coefficients may be calibrated for the PA at multiple transmission power levels (e.g., 11 dBm, 12 dBm, 13 dBm, 14 dBm, 15 dBM, and/or one or more additional transmission power levels) at a same factory temperature, such as the first temperature corresponding to a first power output curve 305. The trained and calibrated DPD coefficients for each transmission power level may effectively reduce non-linearities and other distortions of signals transmitted at the respective power level. The device may store the trained and calibrated DPD coefficients for each transmission power level in a memory of the device. In some examples, the DPD coefficients may be stored in a table format, and each set of DPD coefficients may be indexed by a respective transmission power level. When the device has a message to transmit, the device may determine a target transmission power level for transmitting the message, and the device may use the target transmission power level as a pointer to the table to identify a corresponding set of DPD coefficients to use for transmitting the message. However, as described with reference to FIG. 2 and illustrated in further detail with reference to FIG. 3, such techniques may not account for changes in non-linearities at different temperatures.

For example, the first power output curve 305 illustrates an example input to output power relationship at a first temperature, which may correspond to a room temperature or a factory temperature at which DPD coefficients for the device may be calibrated. The second power output curve 310 illustrates an example input to output power relationship at a second temperature, which may be less than the first temperature. For example, the second temperature may be offset from the first temperature by negative 20 degrees. The third power output curve 315 illustrates an example input to output power relationship at a third temperature, which may be less than the first temperature. For example, the third temperature may be offset from the first temperature by negative 40 degrees.

The fourth power output curve 320 illustrates an example input to output power relationship at a fourth temperature, which may be greater than the first temperature. For example, the fourth temperature may be offset from the first temperature by positive 20 degrees. The fifth power output curve 325 illustrates an example input to output power relationship at a fifth temperature, which may be greater than the first temperature. For example, the fifth temperature may be offset from the first temperature by positive 40 degrees. While FIG. 3 depicts five example power output curves at five different temperature offsets, it is to be understood that the example is for illustrative purpose and is not limiting. For example, an output power of a PA may be distorted according to any shape or function at any different temperature.

In the example of FIG. 3, a signal amplified by the PA may experience an approximate change in output power that corresponds to one decibel (dB) of power output for every 20 degrees in temperature change. For example, as the temperature decreases by 20 degrees from the first power output curve 305 to the second power output curve 310, an output power may increase by one dB. As the temperature of the PA increases by 40 degrees from the first power output curve 305 to the fifth power output curve 325, the output power may decrease by two dBs.

The present disclosure provides for the device to account for such changes in temperature from the factory training temperature. For example, the device may train the DPD coefficients at a factory temperature, and then apply a bias to a target transmission power level based on a current temperature of the device and a constant value to obtain an adjusted transmission power level. The device may use the adjusted transmission power level to determine which DPD coefficients to use from the table of DPD coefficients stored in the memory of the device, which may provide for more accurate selection of DPD coefficients to reduce non-linearities that may occur at the current operating temperature of the device.

The constant value may be determined during a manufacturing stage of the device (e.g., pre-determined or pre-configured at the device) based on one or more parameters associated with PAs used by the device. The one or more parameters may include a type of PA, a physics of the PA, one or more materials used within the PA, a vendor that manufactures the PA, or any combination thereof. In some examples, the constant may be different for each vendor that manufactures the PA (e.g., vendor-specific). In the example of FIG. 3, the constant value for the PA may be 20, because the non-linearities of the PA may change by one dB for every 20 degree change in temperature. However, it is to be understood that the constant value may be any value for any different type of PA.

The device may thereby apply DPD coefficients associated with an adjusted transmission power level to reduce distortion and improve communication reliability. In one example, the device may operate at the factory temperature for a first time period before switching to the fifth temperature (e.g., 40 degrees greater than the factory temperature). The device may determine a target transmission power of 13 dB. The device may apply DPD coefficients that were calibrated at the factory temperature for a transmission power level of 13 dB to a DPD engine of the device to generate signals for the first time period. However, when the temperature of the device increases during the second time period, the non-linearities of the signal may increase.

To adapt for this change, the device may determine an adjusted transmission power level of 11 dB and determine second DPD coefficients that were calibrated at the factory temperature for the adjusted transmission power level of 11 dB. The device may apply the second DPD coefficients to a DPD engine of the device to generate signals transmitted at 13 dB, but at the fifth temperature for the second time period. The adjustment between DPD coefficients may improve reliability and reduce non-linearities of the communications by the device at each temperature. Stated alternatively, the non-linearities experienced by the signal at the factory temperature for 13 dB may be similar to or the same as the non-linearities experienced by the signal at 40 degrees greater than the factory temperature and for 11 dB. Techniques for calculating the adjusted transmission power level are described in further detail with reference to FIG. 4.

Figure 4:
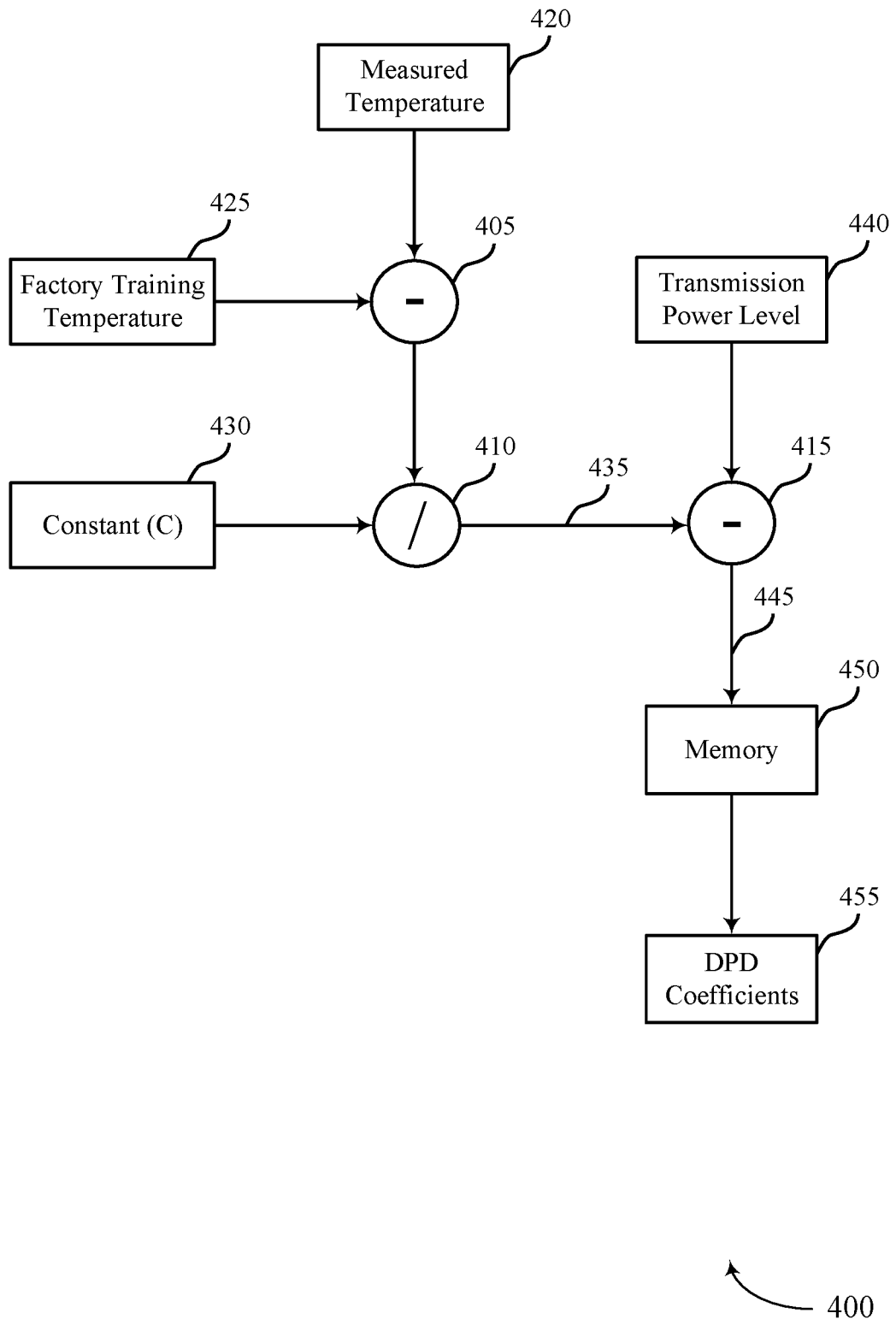
FIG. 4 illustrates an example of a flow diagram that supports techniques for temperature adaptation for DPD factory training in accordance with aspects of the present disclosure.

FIG. 4 illustrates an example of a flow diagram 400 that supports techniques for temperature adaptation for DPD factory training in accordance with aspects of the present disclosure. The flow diagram 400 may implement or be implemented by aspects of the wireless communications systems 100 and 200 described with reference to FIGS. 1 and 2, respectively. For example, the flow diagram 400 illustrates an example process for obtaining adapted DPD coefficients based on a measured temperature 420 of a device. The device may represent an example of a UE 115, a base station, 105, a transmitting device, a receiving device, or some other network node as described with reference to FIGS. 1 through 3.

In the following description of the flow diagram 400, the calculations or procedures for determining DPD coefficients 455 may be performed in different orders or at different times. Some operations may also be left out of the flow diagram 400, or other operations may be added. Additionally, the calculations and operations illustrated in the flow diagram 400 may be performed by one or more components within a device. For example, one or more of the procedures or steps illustrated by the flow diagram may be performed by software that executes on the device, by a DPD engine of the device (e.g., a DPD engine 225 as described with reference to FIG. 2), by a temperature sensor of the device, or any combination thereof.

As described with reference to FIGS. 2 and 3, the device may perform DPD training (e.g., DPD coefficient calibration procedure) in a factory setting at a factory training temperature 425. The device may determine a set of DPD coefficients to reduce non-linearities and other distortions that may occur when transmitting a signal at each of a set of potential transmission power levels 440. The device may store each set of DPD coefficients in a memory 450 of the device. The memory 450 may be non-volatile memory, or some other type of memory. In some examples, the device may store the DPD coefficients in the form of a table in the memory 450, and each potential transmission power level 440 may provide an index or a pointer to a respective set of DPD coefficients to use at that transmission power level 440.

In this example, the flow diagram 400 illustrates an example process for calculating an adjusted transmission power level to use for selecting a set of DPD coefficients 455 to use for subsequent transmissions by the device. The flow diagram 400 may account for differences between an operating temperature of the device (e.g., the measured temperature 420) and the factory training temperature 425 at which the DPD coefficients 455 were calibrated.

At 405, the device may determine a difference between a measured temperature 420 of the device (e.g., a second temperature value) and a factory training temperature 425 (e.g., a first temperature value) at which the DPD training was performed. That is, the device may bias the measured temperature 420 ($T_0$) with the factory training temperature 425 ($T_1$) (e.g., $T_0$–$T_1$). In some examples, the measured temperature 420 may be referred to as an operating temperature or a current temperature of the device.

At 410, the device may determine a power offset value 435 based on the measured temperature 420, the factory training temperature 425, and a constant 430 (C). For example, the device may divide the difference between the measured temperature 420 of the device and the factory training temperature 425 by a constant 430

$$\left(e.g., \frac{T_0 - T_1}{C}\right).$$

A value or me constant 430 may be based on one or more parameters associated with one or more PAs of the device. The one or more parameters may include values indicative of a type of PA (e.g., a PA technology), a physics of the PA, one or more materials within the PA, or any combination thereof. The one or more parameters may be associated with or indicative of an amount of distortion that may be produced by the PA.

In some examples, the constant may be determined during a manufacturing stage of the device. The constant may be based on one or more power output models of the PA, as illustrated in FIG. 3. For example, in the example of FIG. 3, the PA of the device may be associated with a constant value of 20, because the power output model 300 (illustrated in FIG. 3) may indicate that an output power of the PA may change by 1 dB for every 20 degrees that the temperature of the device changes. Alternatively, the constant 430 may have any other value based on any type of PA or other non-linear component of the device.

At 415, the device may apply the power offset value 435 to a transmission power level 440, which may be referred to as a target transmission power level or a measured transmission power level (e.g., $P_{det}$). Applying the power offset value 435 may include subtracting the power offset value 435 from the transmission power level 440 to obtain an adjusted transmission power level 445. If the power offset value 435 is negative, the adjusted transmission power level 445 may be greater than the transmission power level 440. If the power offset value 435 is positive, the adjusted transmission power level 445 may be less than the transmission power level 440. If the power offset value is zero, the measured temperature 420 of the device may be the same as the factory training temperature 425, and the adjusted transmission power level 445 may be the same as the transmission power level 440.

The device may determine a set of DPD coefficients for generating and transmitting a message based on the adjusted transmission power level 445. For example, the adjusted transmission power level 445 may provide a pointer to a respective set of DPD coefficients 455 stored in the memory 450 of the device. The device may apply the set of DPD coefficients 455 to a DPD engine of the device to generate a message, as described with reference to FIG. 2. The device may transmit the message to one or more other devices via an antenna element based on the DPD coefficients 455.

Such techniques for calculating an adjusted transmission power level 445 and determining DPD coefficients 455 based on the adjusted transmission power level may improve communication reliability and efficiency. For example, the described techniques may, in some cases, be performed instead of OTA DPD training, which may reduce costs and complexity associated with DPD training. Additionally or alternatively, the described techniques may provide for DPD coefficients to effectively reduce distortions at a current temperature of the device, which may provide benefits and improvements over other DPD factory training, in which the current temperature of the device may not be accounted for.

Figure 5:
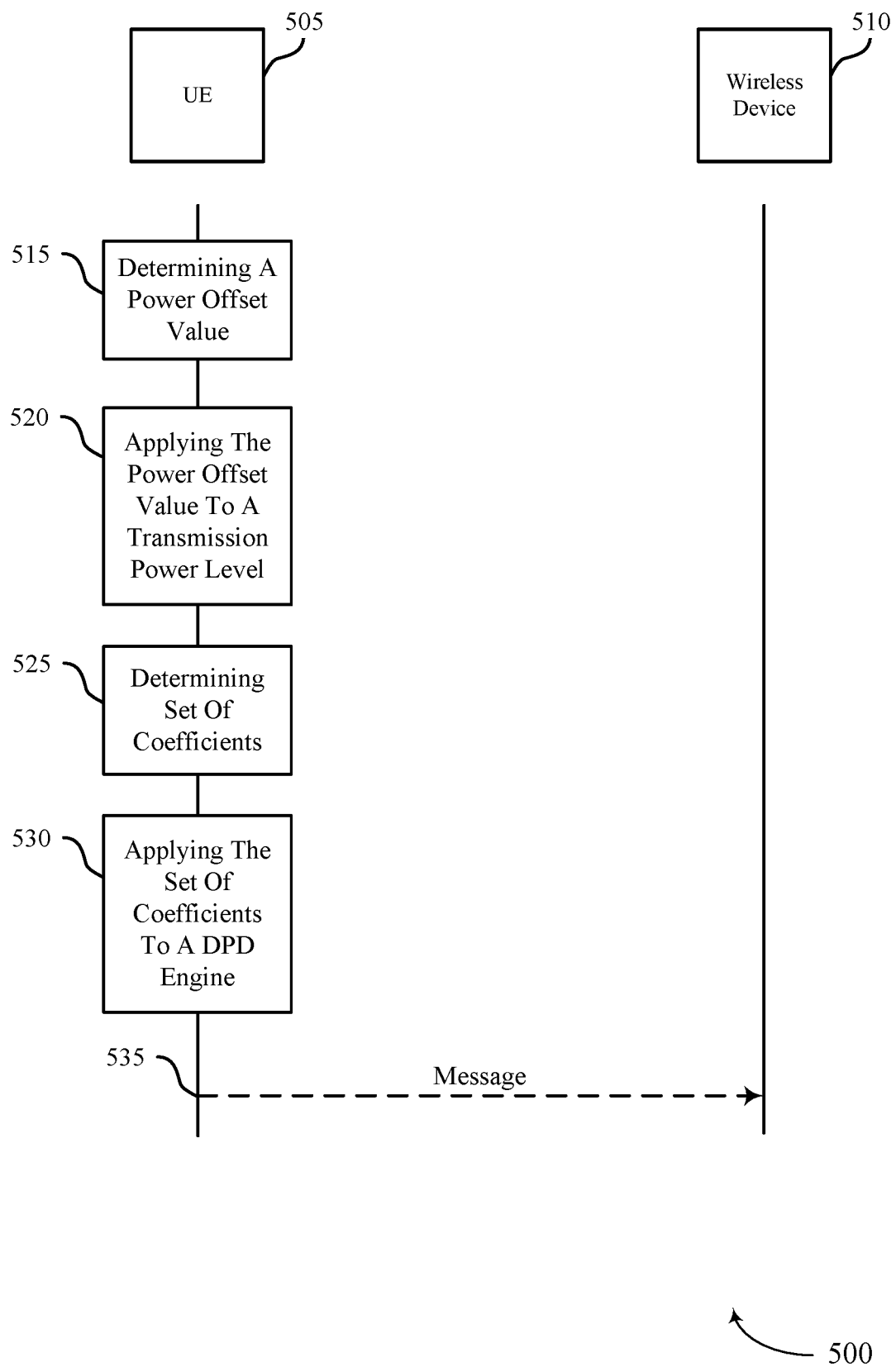
FIG. 5 illustrates an example of a process flow that supports techniques for temperature adaptation for DPD factory training in accordance with aspects of the present disclosure.

FIG. 5 illustrates an example of a process flow 500 that supports techniques for temperature adaptation for DPD factory training in accordance with aspects of the present disclosure. The process flow 500 may implement or be implemented by aspects of the wireless communications systems 100 and 200 as described with reference to FIGS. 1 and 2, respectively. For example, the process flow 500 may implement or be implemented by a UE 505, which may represent an example of a UE 115 as described with reference to FIGS. 1 through 4. Additionally, the process flow 500 may implement or be implemented by a wireless device 510, which may represent an example of a base station 105, a UE 115, a transmitting device, a receiving device, a network node, or any other device, as described with reference to FIGS. 1 through 4.

In the following description of the process flow 500, the operations between the UE 505 and the wireless device 510 may be performed in different orders or at different times. Some operations may also be left out of the process flow 500, or other operations may be added. Although the UE 505 and the wireless device 510 are shown performing the operations of the process flow 500, some aspects of some operations may also be performed by one or more other devices.

At 515, the UE 505 may determine a power offset valued based on a first temperature value associated with a training procedure for the UE 505, a second temperature value associated with the UE 505, and a constant value. The power offset value may, in some examples, be based on a difference between the first temperature and the second temperature. The training procedure (e.g., DPD factory training) may be associated with multiple sets of coefficients for the UE 505. For example, the UE 505 may store the multiple sets of coefficients, which may be referred to as DPD coefficients, in a database of the UE 505 based on the training. Each set of coefficients may be associated with a respective transmission power level.

At 520, the UE 505 may apply the power offset value to a transmission power level for transmission of a message to obtain a first transmission power level. In some examples, the UE 505 may determine the first transmission power level based on a sum of the power offset value and the transmission power level.

At 525, the UE 505 may determine a set of coefficients of the multiple sets of coefficients based on the training procedure and the first transmission power level. For example, the first transmission power level may provide an index or a pointer to the set of coefficients in the database of the UE 505 that includes the multiple sets of coefficients obtained during the training procedure.

At 530, the UE 505 may apply the set of coefficients to a DPD engine of the UE 505 to generate the message. Applying the set of coefficients to the DPD engine may include distorting a signal based on applying the set of coefficients to the DPD engine and amplifying the signal using a PA of the UE 505.

At 535, in some examples, the UE 505 may transmit the message to the wireless device 510 and/or one or more other devices. The UE 505 may transmit the message using at least one antenna element of the UE 505 that is coupled with the PA used to amplify the signal. The UE 505 may transmit the message in accordance with, or at, the transmission power level. The applied set of DPD coefficients may reduce distortions and non-linearities of the message transmitted at the transmission power level and the second temperature of the UE 505.

Figure 6:
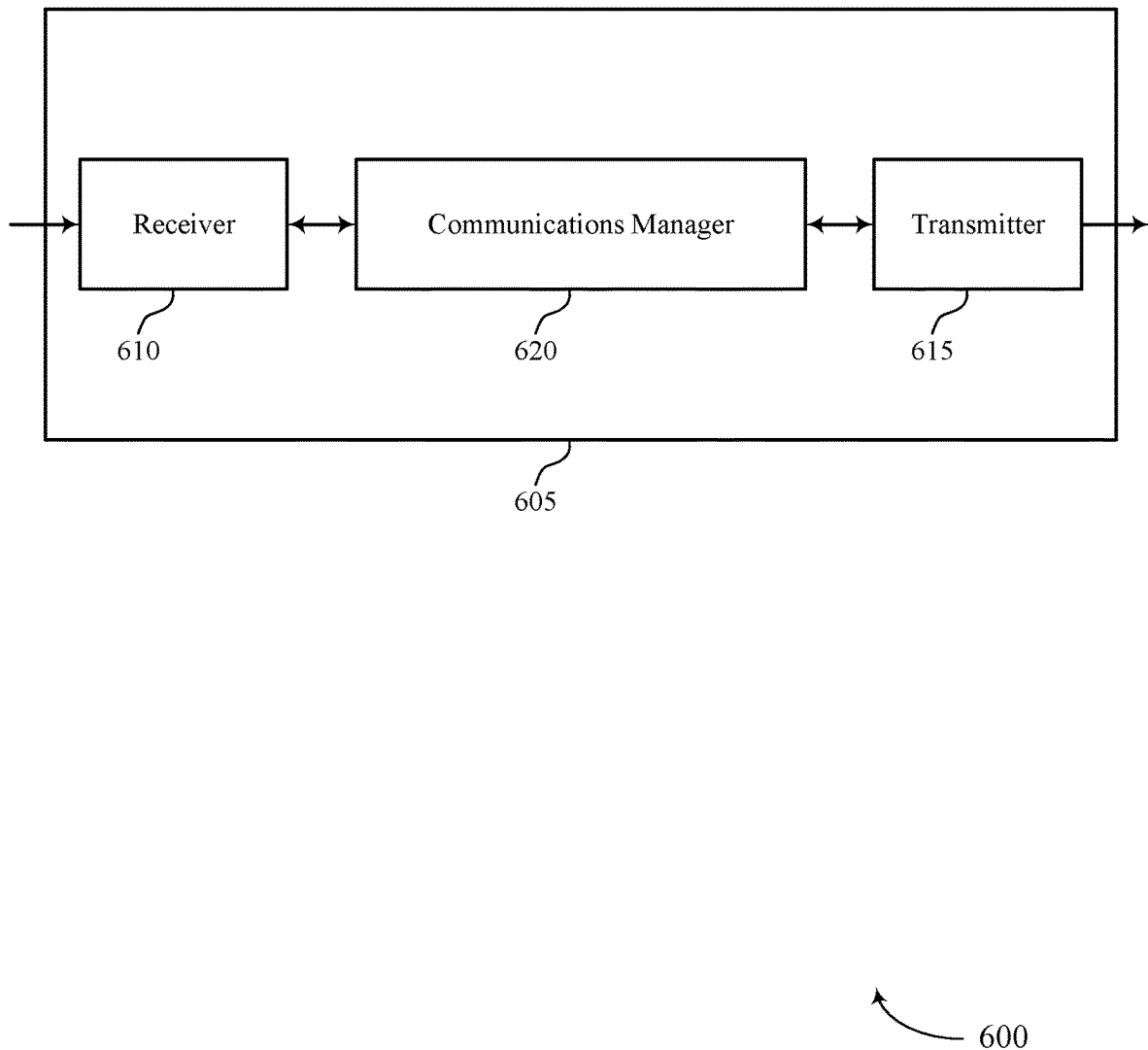
FIGS. 6 and 7 show block diagrams of devices that support techniques for temperature adaptation for DPD factory training in accordance with aspects of the present disclosure.

FIG. 6 shows a block diagram 600 of a device 605 that supports techniques for temperature adaptation for DPD factory training in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for temperature adaptation for DPD factory training). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for temperature adaptation for DPD factory training). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for temperature adaptation for DPD factory training as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for determining a power offset value based on a first temperature value associated with a training procedure for the UE, a second temperature value associated with the UE, and a constant value, where the training procedure is associated with a set of multiple sets of coefficients for the UE. The communications manager 620 may be configured as or otherwise support a means for applying the power offset value to a transmission power level for transmission of a message to obtain a first transmission power level. The communications manager 620 may be configured as or otherwise support a means for determining a set of coefficients of the set of multiple sets of coefficients based on the training procedure and the first transmission power level. The communications manager 620 may be configured as or otherwise support a means for applying the set of coefficients to a DPD engine of the UE to generate the message.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and improved DPD reliability. For example, the processor of the device 605 may refrain from performing a DPD training procedure OTA, which may reduce complexity, processing, and power consumption. The processor may select DPD coefficients to apply for generation of a message based on a temperature of the device 605 or one or more components in the device 605, which may improve an accuracy and reliability of the DPD coefficients. As such, communications by the device 605 may be more reliable and efficient.

Figure 7:
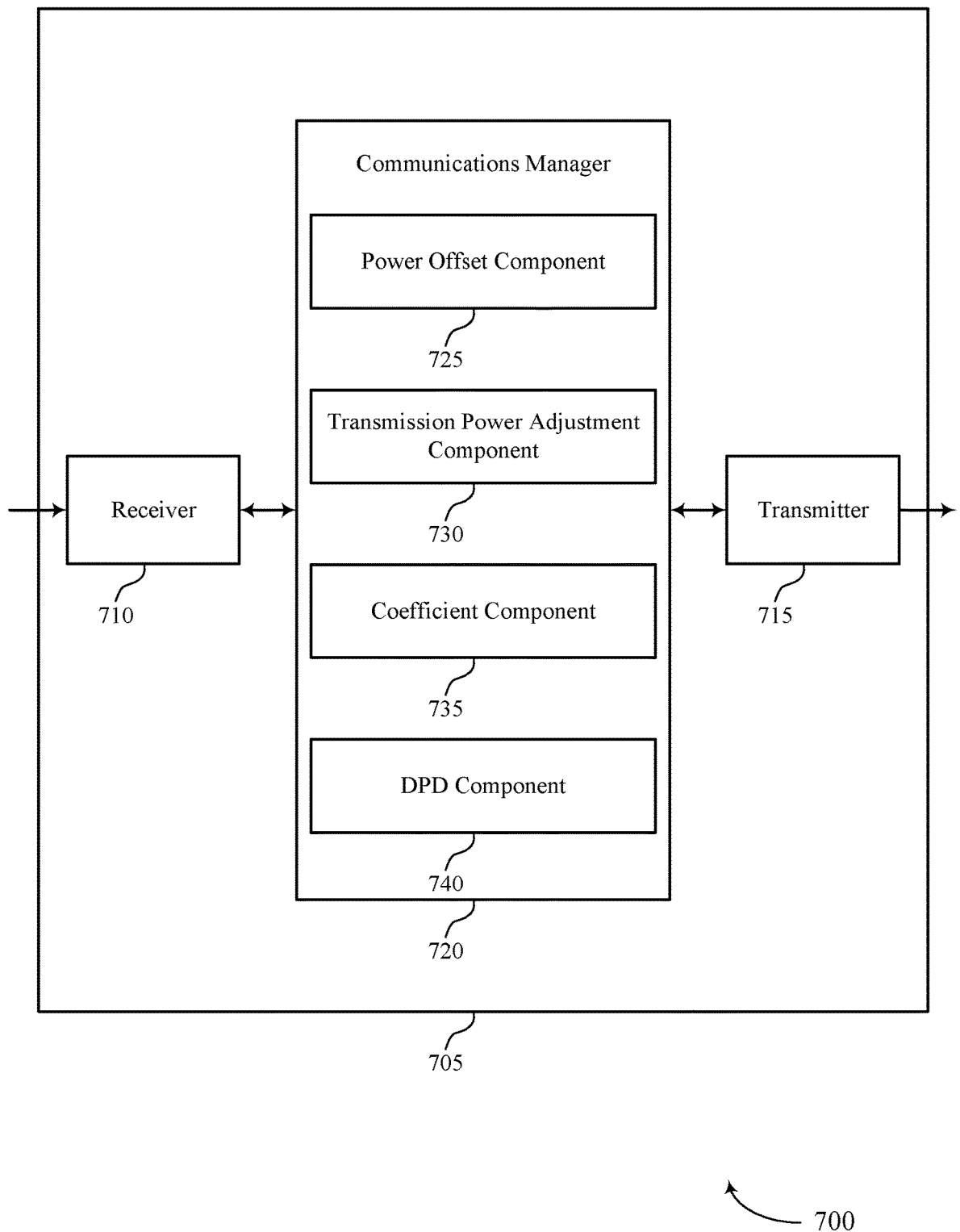

FIG. 7 shows a block diagram 700 of a device 705 that supports techniques for temperature adaptation for DPD factory training in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for temperature adaptation for DPD factory training). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for temperature adaptation for DPD factory training). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for temperature adaptation for DPD factory training as described herein. For example, the communications manager 720 may include a power offset component 725, a transmission power adjustment component 730, a coefficient component 735, a DPD component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The power offset component 725 may be configured as or otherwise support a means for determining a power offset value based on a first temperature value associated with a training procedure for the UE, a second temperature value associated with the UE, and a constant value, where the training procedure is associated with a set of multiple sets of coefficients for the UE. The transmission power adjustment component 730 may be configured as or otherwise support a means for applying the power offset value to a transmission power level for transmission of a message to obtain a first transmission power level. The coefficient component 735 may be configured as or otherwise support a means for determining a set of coefficients of the set of multiple sets of coefficients based on the training procedure and the first transmission power level. The DPD component 740 may be configured as or otherwise support a means for applying the set of coefficients to a DPD engine of the UE to generate the message.

Figure 8:
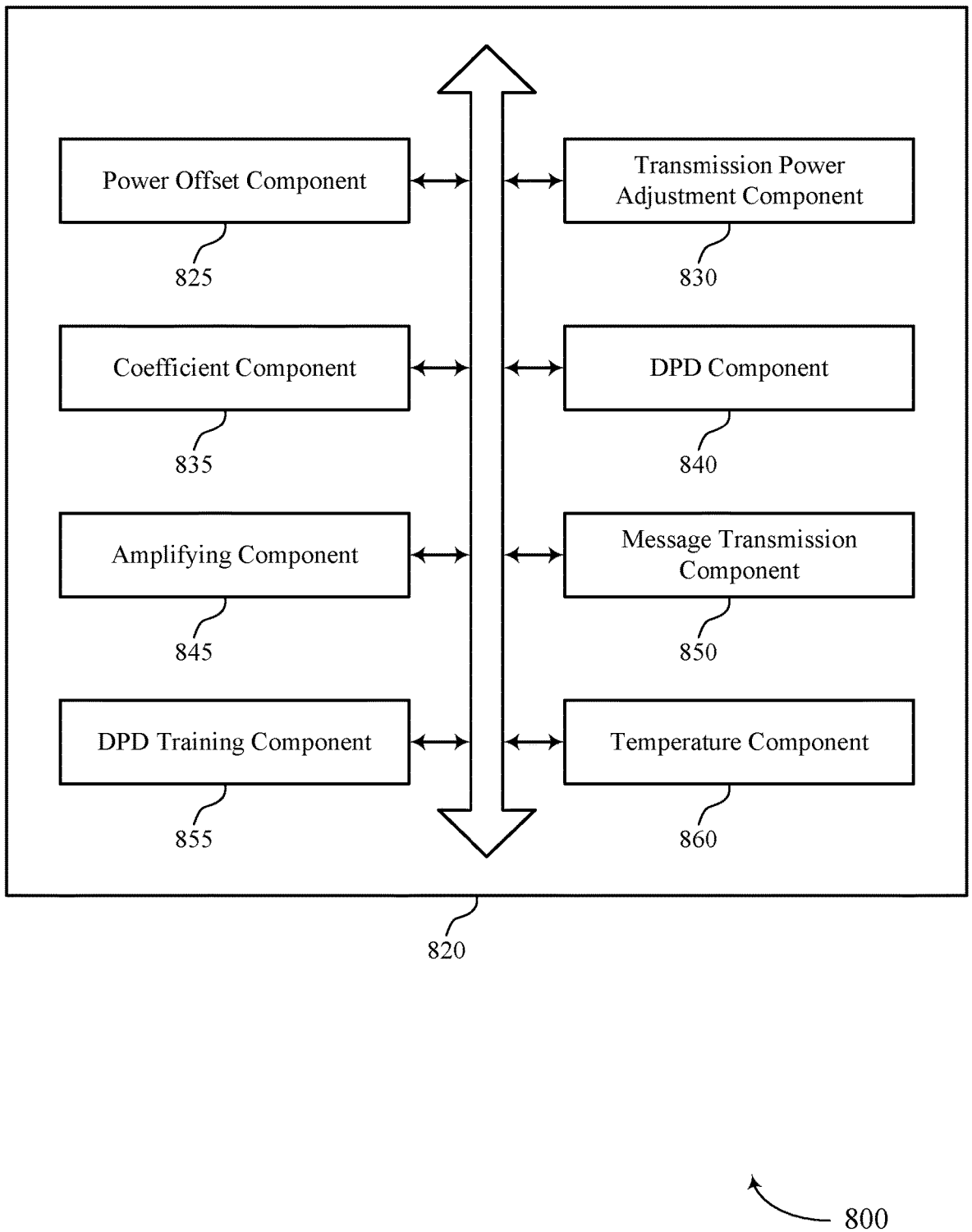
FIG. 8 shows a block diagram of a communications manager that supports techniques for temperature adaptation for DPD factory training in accordance with aspects of the present disclosure.

FIG. 8 shows a block diagram 800 of a communications manager 820 that supports techniques for temperature adaptation for DPD factory training in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for temperature adaptation for DPD factory training as described herein. For example, the communications manager 820 may include a power offset component 825, a transmission power adjustment component 830, a coefficient component 835, a DPD component 840, an amplifying component 845, a message transmission component 850, a DPD training component 855, a temperature component 860, or any combination thereof. Each of these components may communicate, directly or indirectly, with one another (e.g., via one or more buses).

The communications manager 820 may support wireless communication at a UE in accordance with examples as disclosed herein. The power offset component 825 may be configured as or otherwise support a means for determining a power offset value based on a first temperature value associated with a training procedure for the UE, a second temperature value associated with the UE, and a constant value, where the training procedure is associated with a set of multiple sets of coefficients for the UE. The transmission power adjustment component 830 may be configured as or otherwise support a means for applying the power offset value to a transmission power level for transmission of a message to obtain a first transmission power level. The coefficient component 835 may be configured as or otherwise support a means for determining a set of coefficients of the set of multiple sets of coefficients based on the training procedure and the first transmission power level. The DPD component 840 may be configured as or otherwise support a means for applying the set of coefficients to a DPD engine of the UE to generate the message.

In some examples, to support applying the set of coefficients to the DPD engine, the DPD component 840 may be configured as or otherwise support a means for distorting a signal based on applying the set of coefficients to the DPD engine. In some examples, to support applying the set of coefficients to the DPD engine, the amplifying component 845 may be configured as or otherwise support a means for amplifying the signal using a PA of the UE that is coupled with at least one antenna element of a set of multiple antenna elements of the UE. In some examples, to support applying the set of coefficients to the DPD engine, the message transmission component 850 may be configured as or otherwise support a means for transmitting the message in accordance with the transmission power level and based on amplifying the signal. In some examples, to support transmitting the message, the message transmission component 850 may be configured as or otherwise support a means for transmitting the message from the at least one antenna element of the UE that is coupled with the PA.

In some examples, the DPD training component 855 may be configured as or otherwise support a means for storing, based on the training procedure, the set of multiple sets of coefficients including at least the set of coefficients in a database of the UE, each set of coefficients associated with a respective transmission power level of a set of multiple transmission power levels including at least the first transmission power level, where determining the set of coefficients may be based on the first transmission power level of the set of multiple transmission power levels and the database.

In some examples, to support applying the power offset value to the transmission power level, the transmission power adjustment component 830 may be configured as or otherwise support a means for determining the first transmission power level based on a sum of the power offset value and the transmission power level, where the power offset value is based on a difference between the first temperature value and the second temperature value. In some examples, the database of the UE may include non-volatile memory.

In some examples, the DPD training component 855 may be configured as or otherwise support a means for performing the training procedure, where performing the training procedure may include determining a respective set of coefficients for each transmission power level of the set of multiple transmission power levels, where the respective set of coefficients reduces non-linearities associated with transmissions by the UE at the respective transmission power level, and where a temperature of the UE during the training corresponds to the first temperature value.

In some examples, the constant value is based on one or more parameters associated with a PA at the UE, the one or more parameters including one or more values indicative of a type of the PA, a physics of the PA, one or more materials within the PA, or any combination thereof.

In some examples, the power offset component 825 may be configured as or otherwise support a means for determining a difference between the first temperature value and the second temperature value of the UE, where determining the power offset value may be based on the difference. In some examples, the temperature component 860 may be configured as or otherwise support a means for measuring the second temperature value of the UE, where the second temperature value corresponds to an operating temperature of the UE.

In some examples, to support transmitting the message, the message transmission component 850 may be configured as or otherwise support a means for transmitting the message in a FR2 or a frequency range including frequencies that are greater than the FR2.

Figure 9:
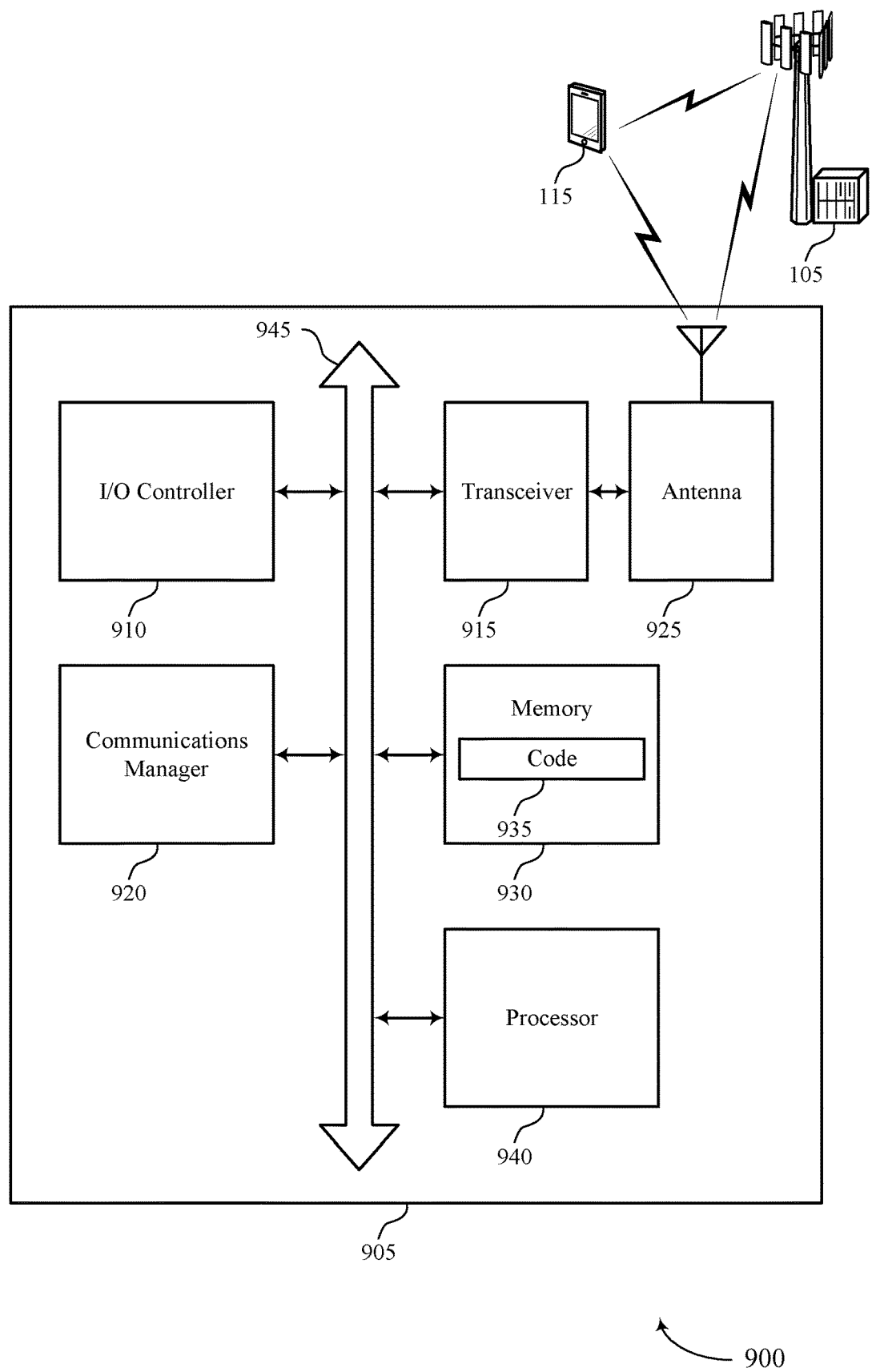
FIG. 9 shows a diagram of a system including a device that supports techniques for temperature adaptation for DPD factory training in accordance with aspects of the present disclosure.

FIG. 9 shows a diagram of a system 900 including a device 905 that supports techniques for temperature adaptation for DPD factory training in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for temperature adaptation for DPD factory training). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for determining a power offset value based on a first temperature value associated with a training procedure for the UE, a second temperature value associated with the UE, and a constant value, where the training procedure is associated with a set of multiple sets of coefficients for the UE. The communications manager 920 may be configured as or otherwise support a means for applying the power offset value to a transmission power level for transmission of a message to obtain a first transmission power level. The communications manager 920 may be configured as or otherwise support a means for determining a set of coefficients of the set of multiple sets of coefficients based on the training procedure and the first transmission power level. The communications manager 920 may be configured as or otherwise support a means for applying the set of coefficients to a DPD engine of the UE to generate the message.

By including or configuring the communications manager 920 in accordance with examples as described herein, the device 905 may support techniques for improved communication reliability, reduced latency, reduced power consumption, improved coordination between devices, and longer battery life. For example, the device 905 may perform DPD training in a factory setting upon initialization of the device 905, which may be associated with reduced complexity and power consumption as compared with OTA DPD training. Additionally or alternatively, the device 905 may account for a temperature of the device when selecting DPD coefficients to apply, which may improve reliability as compared with DPD procedures in which the device 905 does not account for an operating temperature. The device 905 may apply the DPD coefficients for generation and transmission of a message to a receiving device. The DPD coefficients may be more reliable and improve coordination between the devices as compared with DPD coefficients that do not account for the operating temperature.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for temperature adaptation for DPD factory training as described herein, or the processor 940 and the memory 930 may be otherwise configured to perform or support such operations.

Figure 10:
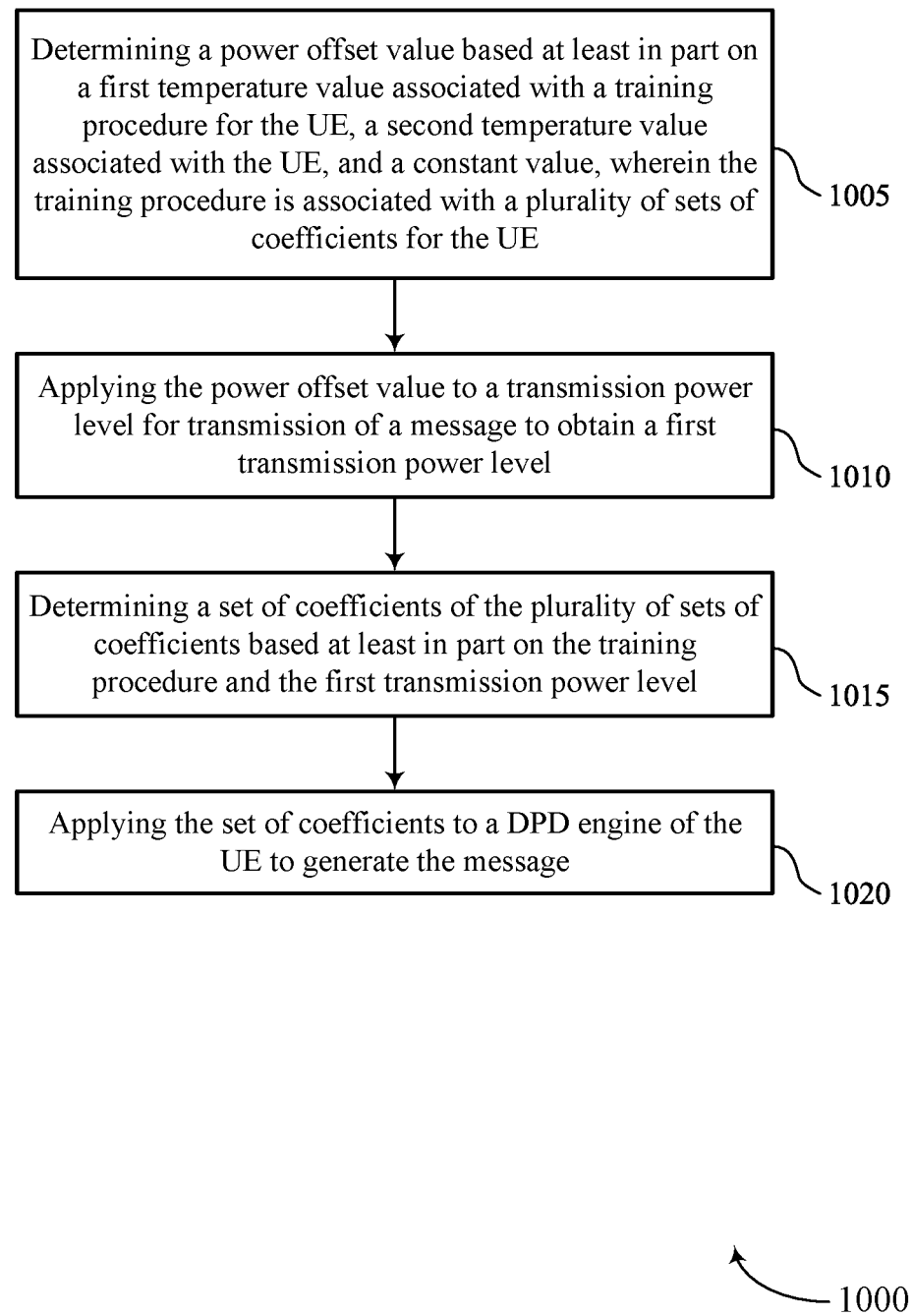
FIGS. 10 through 12 show flowcharts illustrating methods that support techniques for temperature adaptation for DPD factory training in accordance with aspects of the present disclosure.

FIG. 10 shows a flowchart illustrating a method 1000 that supports techniques for temperature adaptation for DPD factory training in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include determining a power offset value based on a first temperature value associated with a training procedure for the UE, a second temperature value associated with the UE, and a constant value, where the training procedure is associated with a set of multiple sets of coefficients for the UE. The operations of 1005 may be performed in accordance with examples as disclosed herein. In some examples, aspects of the operations of 1005 may be performed by a power offset component 825 as described with reference to FIG. 8.

At 1010, the method may include applying the power offset value to a transmission power level for transmission of a message to obtain a first transmission power level. The operations of 1010 may be performed in accordance with examples as disclosed herein. In some examples, aspects of the operations of 1010 may be performed by a transmission power adjustment component 830 as described with reference to FIG. 8.

At 1015, the method may include determining a set of coefficients of the set of multiple sets of coefficients based on the training procedure and the first transmission power level. The operations of 1015 may be performed in accordance with examples as disclosed herein. In some examples, aspects of the operations of 1015 may be performed by a coefficient component 835 as described with reference to FIG. 8.

At 1020, the method may include applying the set of coefficients to a DPD engine of the UE to generate the message. The operations of 1020 may be performed in accordance with examples as disclosed herein. In some examples, aspects of the operations of 1020 may be performed by a DPD component 840 as described with reference to FIG. 8.

Figure 11:
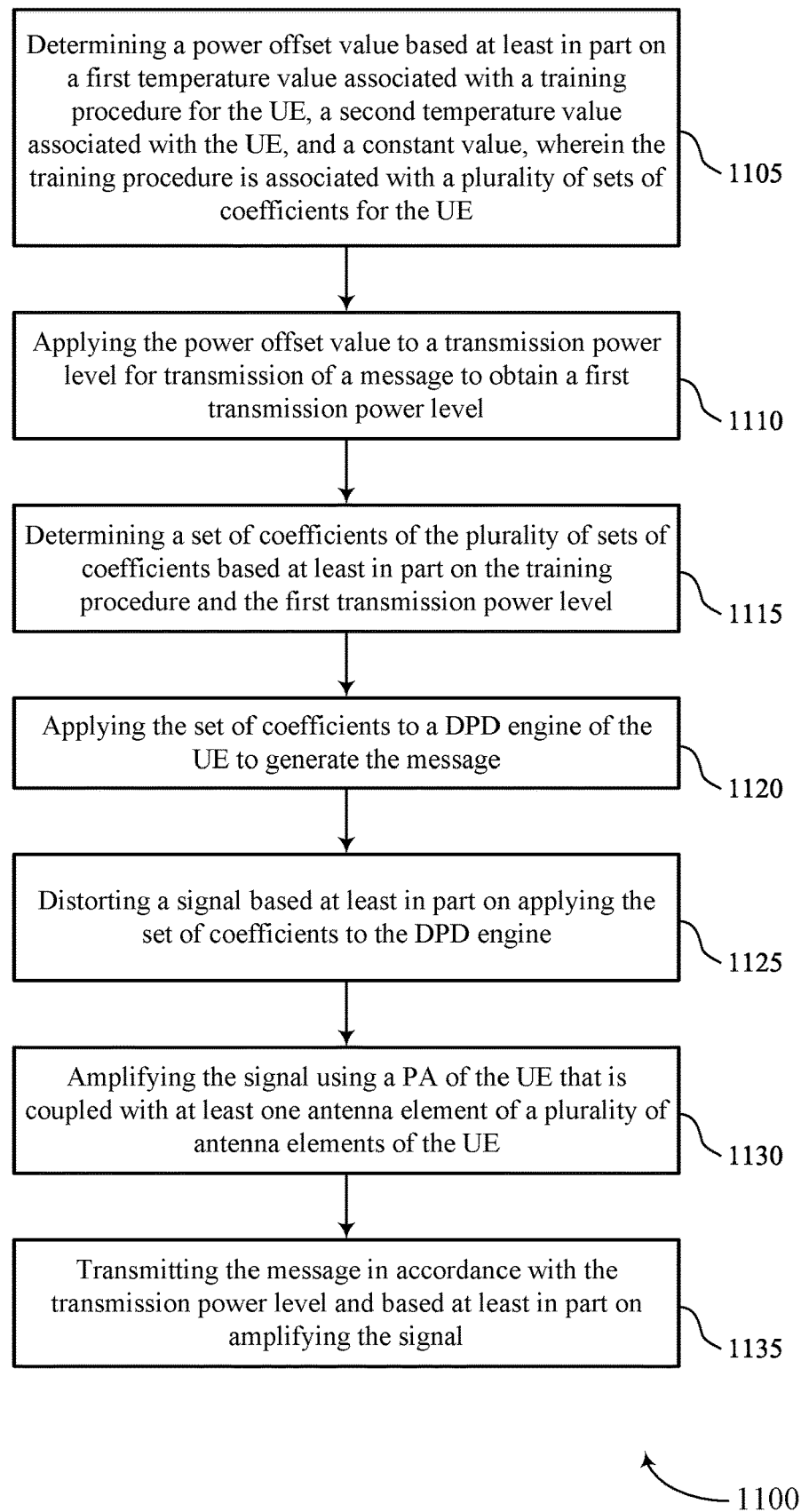

FIG. 11 shows a flowchart illustrating a method 1100 that supports techniques for temperature adaptation for DPD factory training in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include determining a power offset value based on a first temperature value associated with a training procedure for the UE, a second temperature value associated with the UE, and a constant value, where the training procedure is associated with a set of multiple sets of coefficients for the UE. The operations of 1105 may be performed in accordance with examples as disclosed herein. In some examples, aspects of the operations of 1105 may be performed by a power offset component 825 as described with reference to FIG. 8.

At 1110, the method may include applying the power offset value to a transmission power level for transmission of a message to obtain a first transmission power level. The operations of 1110 may be performed in accordance with examples as disclosed herein. In some examples, aspects of the operations of 1110 may be performed by a transmission power adjustment component 830 as described with reference to FIG. 8.

At 1115, the method may include determining a set of coefficients of the set of multiple sets of coefficients based on the training procedure and the first transmission power level. The operations of 1115 may be performed in accordance with examples as disclosed herein. In some examples, aspects of the operations of 1115 may be performed by a coefficient component 835 as described with reference to FIG. 8.

At 1120, the method may include applying the set of coefficients to a DPD engine of the UE to generate the message. The operations of 1120 may be performed in accordance with examples as disclosed herein. In some examples, aspects of the operations of 1120 may be performed by a DPD component 840 as described with reference to FIG. 8.

At 1125, the method may include distorting a signal based on applying the set of coefficients to the DPD engine. The operations of 1125 may be performed in accordance with examples as disclosed herein. In some examples, aspects of the operations of 1125 may be performed by a DPD component 840 as described with reference to FIG. 8.

At 1130, the method may include amplifying the signal using a PA of the UE that is coupled with at least one antenna element of a set of multiple antenna elements of the UE. The operations of 1130 may be performed in accordance with examples as disclosed herein. In some examples, aspects of the operations of 1130 may be performed by an amplifying component 845 as described with reference to FIG. 8.

At 1135, the method may include transmitting the message in accordance with the transmission power level and based on amplifying the signal. The operations of 1135 may be performed in accordance with examples as disclosed herein. In some examples, aspects of the operations of 1135 may be performed by a message transmission component 850 as described with reference to FIG. 8.

Figure 12:
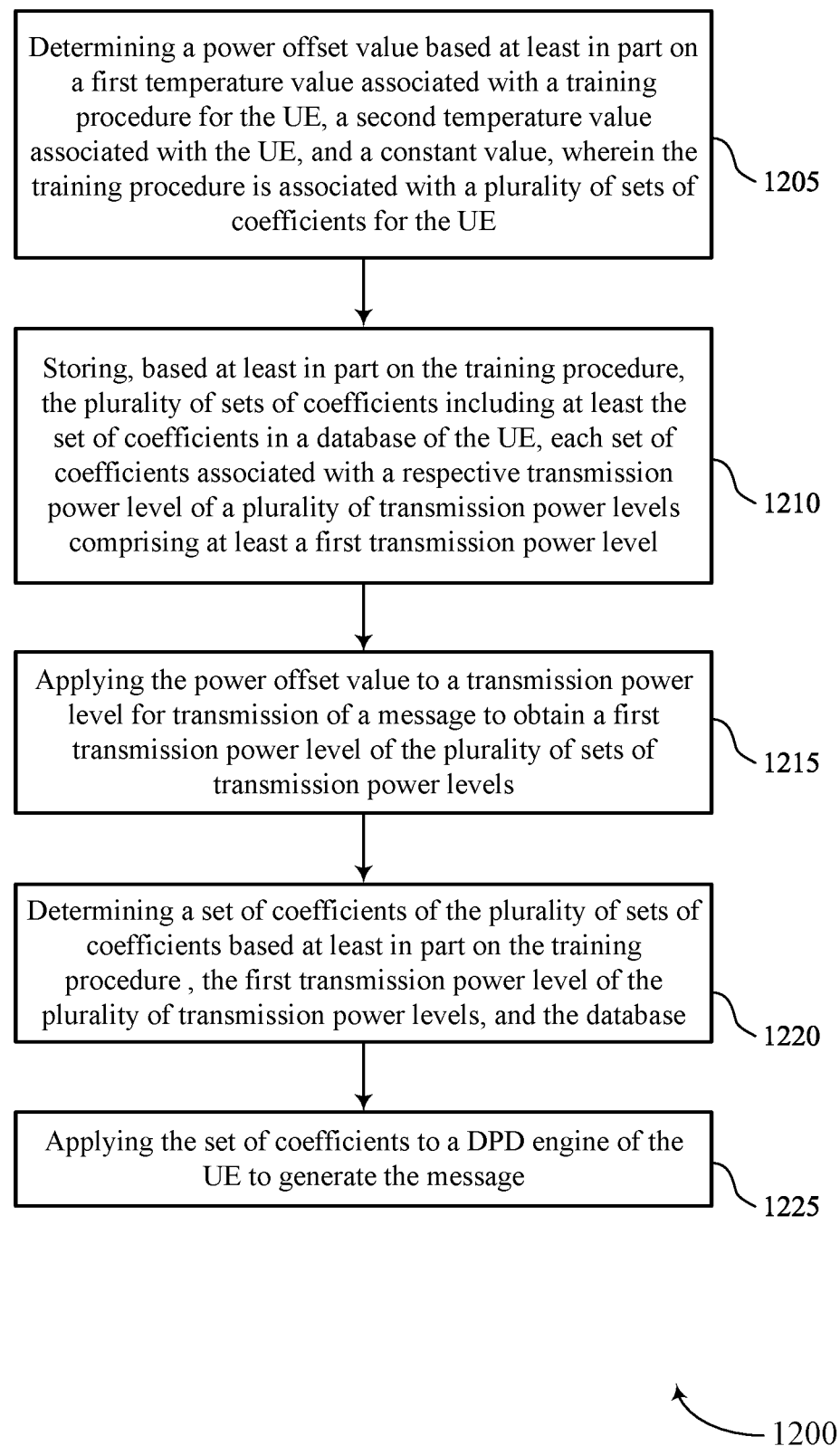

FIG. 12 shows a flowchart illustrating a method 1200 that supports techniques for temperature adaptation for DPD factory training in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include determining a power offset value based on a first temperature value associated with a training procedure for the UE, a second temperature value associated with the UE, and a constant value, where the training procedure is associated with a set of multiple sets of coefficients for the UE. The operations of 1205 may be performed in accordance with examples as disclosed herein.

In some examples, aspects of the operations of 1205 may be performed by a power offset component 825 as described with reference to FIG. 8.

At 1210, the method may include storing, based at least in part on the training procedure, the set of multiple sets of coefficients in a database of the UE, each set of coefficients associated with a respective transmission power level of a set of multiple transmission power levels including at least a first transmission power level. The operations of 1210 may be performed in accordance with examples as disclosed herein. In some examples, aspects of the operations of 1210 may be performed by a DPD training component 855 as described with reference to FIG. 8.

At 1215, the method may include applying the power offset value to a transmission power level for transmission of a message to obtain a first transmission power level of the set of multiple sets of transmission power levels. The operations of 1215 may be performed in accordance with examples as disclosed herein. In some examples, aspects of the operations of 1215 may be performed by a transmission power adjustment component 830 as described with reference to FIG. 8.

At 1220, the method may include determining a set of coefficients of the set of multiple sets of coefficients based on the training procedure, the first transmission power level of the set of multiple sets of transmission power levels, and the database. The operations of 1220 may be performed in accordance with examples as disclosed herein. In some examples, aspects of the operations of 1220 may be performed by a coefficient component 835 as described with reference to FIG. 8.

At 1225, the method may include applying the set of coefficients to a DPD engine of the UE to generate the message. The operations of 1225 may be performed in accordance with examples as disclosed herein. In some examples, aspects of the operations of 1225 may be performed by a DPD component 840 as described with reference to FIG. 8.

The following provides an overview of aspects of the present disclosure:

Aspect 1: A method for wireless communication at a UE, comprising: determining a power offset value based at least in part on a first temperature value associated with a training procedure for the UE, a second temperature value associated with the UE, and a constant value, wherein the training procedure is associated with a plurality of sets of coefficients for the UE; applying the power offset value to a transmission power level for transmission of a message to obtain a first transmission power level; determining a set of coefficients of the plurality of sets of coefficients based at least in part on the training procedure and the first transmission power level; and applying the set of coefficients to a DPD engine of the UE to generate the message.

Aspect 2: The method of aspect 1, wherein applying the set of coefficients to the DPD engine comprises: distorting a signal based at least in part on applying the set of coefficients to the DPD engine; amplifying the signal using a PA of the UE that is coupled with at least one antenna element of a plurality of antenna elements of the UE; and transmitting the message in accordance with the transmission power level and based at least in part on amplifying the signal.

Aspect 3: The method of aspect 2, wherein transmitting the message comprises: transmitting the message from the at least one antenna element of the UE that is coupled with the PA.

Aspect 4: The method of any of aspects 1 through 3, further comprising: storing, based at least in part on the training procedure, the plurality of sets of coefficients including at least the set of coefficients in a database of the UE, each set of coefficients associated with a respective transmission power level of a plurality of transmission power levels comprising at least the first transmission power level, wherein determining the set of coefficients is based at least in part on the first transmission power level of the plurality of transmission power levels and the database.

Aspect 5: The method of aspect 4, wherein applying the power offset value to the transmission power level comprises: determining the first transmission power level based at least in part on a sum of the power offset value and the transmission power level, wherein the power offset value is based at least in part on a difference between the first temperature value and the second temperature value.

Aspect 6: The method of any of aspects 4 through 5, wherein the database of the UE comprises non-volatile memory.

Aspect 7: The method of any of aspects 4 through 6, further comprising: performing the training procedure, wherein performing the training procedure comprises: determining a respective set of coefficients for each transmission power level of the plurality of transmission power levels, wherein the respective set of coefficients reduces non-linearities associated with transmissions by the UE at the respective transmission power level, and wherein a temperature of the UE during the training procedure corresponds to the first temperature value.

Aspect 8: The method of any of aspects 1 through 7, wherein the constant value is based at least in part on one or more parameters associated with a PA at the UE, the one or more parameters comprising one or more values indicative of a type of the PA, a physics of the PA, one or more materials within the PA, or any combination thereof Aspect 9: The method of any of aspects 1 through 8, further comprising: determining a difference between the first temperature value and the second temperature value of the UE, wherein determining the power offset value is based at least in part on the difference.

Aspect 10: The method of any of aspects 1 through 9, further comprising: measuring the second temperature value of the UE, wherein the second temperature value corresponds to an operating temperature of the UE.

Aspect 11: The method of any of aspects 1 through 10, wherein transmitting the message comprises: transmitting the message in a frequency range 2 (FR2) or a frequency range comprising frequencies that are greater than the FR2.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the present disclosure may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the present disclosure. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   determining a power offset value based at least in part on a first temperature value associated with a training procedure for the UE, a second temperature value associated with the UE, and a constant value, wherein the training procedure is associated with a plurality of sets of coefficients for the UE;
   applying the power offset value to a transmission power level for transmission of a message to obtain a first transmission power level;
   determining a set of coefficients of the plurality of sets of coefficients based at least in part on the training procedure and the first transmission power level; and
   applying the set of coefficients to a digital pre-distortion engine of the UE to generate the message.

2. The method of claim 1, wherein applying the set of coefficients to the digital pre-distortion engine comprises:
   distorting a signal based at least in part on applying the set of coefficients to the digital pre-distortion engine;
   amplifying the signal using a power amplifier of the UE that is coupled with at least one antenna element of a plurality of antenna elements of the UE; and
   transmitting the message in accordance with the transmission power level and based at least in part on amplifying the signal.

3. The method of claim 2, wherein transmitting the message comprises:
   transmitting the message from the at least one antenna element of the UE that is coupled with the power amplifier.

4. The method of claim 1, further comprising:
   storing, based at least in part on the training procedure, the plurality of sets of coefficients including at least the set of coefficients in a database of the UE, each set of coefficients associated with a respective transmission power level of a plurality of transmission power levels comprising at least the first transmission power level, wherein determining the set of coefficients is based at least in part on the first transmission power level of the plurality of transmission power levels and the database.

5. The method of claim 4, wherein applying the power offset value to the transmission power level comprises:
   determining the first transmission power level based at least in part on a sum of the power offset value and the transmission power level, wherein the power offset value is based at least in part on a difference between the first temperature value and the second temperature value.

6. The method of claim 4, wherein the database of the UE comprises non-volatile memory.

7. The method of claim 4, further comprising:
   performing the training procedure, wherein performing the training procedure comprises:
      determining a respective set of coefficients for each transmission power level of the plurality of transmission power levels, wherein the respective set of coefficients reduces non-linearities associated with transmissions by the UE at the respective transmission power level, and wherein a temperature of the UE during the training procedure corresponds to the first temperature value.

8. The method of claim 1, wherein the constant value is based at least in part on one or more parameters associated with a power amplifier at the UE, the one or more parameters comprising one or more values indicative of a type of the power amplifier, a physics of the power amplifier, one or more materials within the power amplifier, or any combination thereof.

9. The method of claim 1, further comprising:
determining a difference between the first temperature value and the second temperature value of the UE, wherein determining the power offset value is based at least in part on the difference.

10. The method of claim 1, further comprising:
measuring the second temperature value of the UE, wherein the second temperature value corresponds to an operating temperature of the UE.

11. The method of claim 1, wherein transmitting the message comprises:
transmitting the message in a frequency range 2 (FR2) or a frequency range comprising frequencies that are greater than the FR2.

12. An apparatus for wireless communication at a user equipment (UE), comprising:
a processor;
memory coupled with the processor; and
instructions stored in the memory and executable by the processor to cause the apparatus to:
determine a power offset value based at least in part on a first temperature value associated with a training procedure for the UE, a second temperature value associated with the UE, and a constant value, wherein the training procedure is associated with a plurality of sets of coefficients for the UE;
apply the power offset value to a transmission power level for transmission of a message to obtain a first transmission power level;
determine a set of coefficients of the plurality of sets of coefficients based at least in part on the training procedure and the first transmission power level; and
apply the set of coefficients to a digital pre-distortion engine of the UE to generate the message.

13. The apparatus of claim 12, wherein the instructions to apply the set of coefficients to the digital pre-distortion engine of the UE are executable by the processor to cause the apparatus to:
distort a signal based at least in part on applying the set of coefficients to the digital pre-distortion engine;
amplify the signal using a power amplifier of the UE that is coupled with at least one antenna element of a plurality of antenna elements of the UE; and
transmit the message in accordance with the transmission power level and based at least in part on amplifying the signal.

14. The apparatus of claim 13, wherein the instructions to transmit the message are executable by the processor to cause the apparatus to:
transmit the message from the at least one antenna element of the UE that is coupled with the power amplifier.

15. The apparatus of claim 12, wherein the instructions are further executable by the processor to cause the apparatus to:
store, based at least in part on the training procedure, the plurality of sets of coefficients including at least the set of coefficients in a database of the UE, each set of coefficients associated with a respective transmission power level of a plurality of transmission power levels comprising at least the first transmission power level, wherein determining the set of coefficients is based at least in part on the first transmission power level of the plurality of transmission power levels and the database.

16. The apparatus of claim 15, wherein the instructions to apply the power offset value to the transmission power level are executable by the processor to cause the apparatus to:
determine the first transmission power level based at least in part on a sum of the power offset value and the transmission power level, wherein the power offset value is based at least in part on a difference between the first temperature value and the second temperature value.

17. The apparatus of claim 15, wherein:
the database of the UE comprises non-volatile memory.

18. The apparatus of claim 15, wherein the instructions are further executable by the processor to cause the apparatus to:
perform the training procedure, wherein the instructions to perform the training procedure are executable by the processor to cause the apparatus to:
determine a respective set of coefficients for each transmission power level of the plurality of transmission power levels, wherein the respective set of coefficients reduces non-linearities associated with transmissions by the UE at the respective transmission power level, and wherein a temperature of the UE during the training procedure corresponds to the first temperature value.

19. The apparatus of claim 12, wherein the constant value is based at least in part on one or more parameters associated with a power amplifier at the UE, the one or more parameters comprising one or more values indicative of a type of the power amplifier, a physics of the power amplifier, one or more materials within the power amplifier, or any combination thereof.

20. The apparatus of claim 12, wherein the instructions are further executable by the processor to cause the apparatus to:
determine a difference between the first temperature value and the second temperature value of the UE, wherein determining the power offset value is based at least in part on the difference.

21. The apparatus of claim 12, wherein the instructions are further executable by the processor to cause the apparatus to:
measure the second temperature value of the UE, wherein the second temperature value corresponds to an operating temperature of the UE.

22. The apparatus of claim 12, wherein the instructions to transmit the message are executable by the processor to cause the apparatus to:
transmit the message in a frequency range 2 (FR2) or a frequency range comprising frequencies that are greater than the FR2.

23. An apparatus for wireless communication at a user equipment (UE), comprising:
means for determining a power offset value based at least in part on a first temperature value associated with a training procedure for the UE, a second temperature value associated with the UE, and a constant value, wherein the training procedure is associated with a plurality of sets of coefficients for the UE;
means for applying the power offset value to a transmission power level for transmission of a message to obtain a first transmission power level;
means for determining a set of coefficients of the plurality of sets of coefficients based at least in part on the training procedure and the first transmission power level; and
means for applying the set of coefficients to a digital pre-distortion engine of the UE to generate the message.

24. The apparatus of claim 23, wherein the means for applying the set of coefficients to the digital pre-distortion engine comprise:
- means for distorting a signal based at least in part on applying the set of coefficients to the digital pre-distortion engine;
- means for amplifying the signal using a power amplifier of the UE that is coupled with at least one antenna element of a plurality of antenna elements of the UE; and
- means for transmitting the message in accordance with the transmission power level and based at least in part on amplifying the signal.

25. The apparatus of claim 24, wherein the means for transmitting the message comprise:
- means for transmitting the message from the at least one antenna element of the UE that is coupled with the power amplifier.

26. The apparatus of claim 23, further comprising:
- means for storing, based at least in part on the training procedure, the plurality of sets of coefficients including at least the set of coefficients in a database of the UE, each set of coefficients associated with a respective transmission power level of a plurality of transmission power levels comprising at least the first transmission power level, wherein determining the set of coefficients is based at least in part on the first transmission power level of the plurality of transmission power levels and the database.

27. The apparatus of claim 23, wherein the constant value is based at least in part on one or more parameters associated with a power amplifier at the UE, the one or more parameters comprising one or more values indicative of a type of the power amplifier, a physics of the power amplifier, one or more materials within the power amplifier, or any combination thereof.

28. A non-transitory computer-readable medium storing code for wireless communication at a user equipment (UE), the code comprising instructions executable by a processor to:
- determine a power offset value based at least in part on a first temperature value associated with a training procedure for the UE, a second temperature value associated with the UE, and a constant value, wherein the training procedure is associated with a plurality of sets of coefficients for the UE;
- apply the power offset value to a transmission power level for transmission of a message to obtain a first transmission power level;
- determine a set of coefficients of the plurality of sets of coefficients based at least in part on the training procedure and the first transmission power level; and
- apply the set of coefficients to a digital pre-distortion engine of the UE to generate the message.

29. The non-transitory computer-readable medium of claim 28, wherein the instructions to apply the set of coefficients to the digital pre-distortion engine are executable by the processor to:
- distort a signal based at least in part on applying the set of coefficients to the digital pre-distortion engine;
- amplify the signal using a power amplifier of the UE that is coupled with at least one antenna element of a plurality of antenna elements of the UE; and
- transmit the message in accordance with the transmission power level and based at least in part on amplifying the signal.

30. The non-transitory computer-readable medium of claim 29, wherein the instructions to transmit the message are executable by the processor to:
- transmit the message from the at least one antenna element of the UE that is coupled with the power amplifier.

* * * * *